United States Patent
Heiartz et al.

(10) Patent No.: US 6,814,197 B2
(45) Date of Patent: Nov. 9, 2004

(54) ACTUATING DEVICE FOR A FRICTION CLUTCH DEVICE, POSSIBLY A DUAL OR MULTIPLE FRICTION CLUTCH DEVICE

(75) Inventors: Markus Heiartz, Würzburg (DE); Andreas Orlamünder, Schweinfurt (DE); Sebastian Vogt, Bad Neustadt (DE); Olaf Pagels, Bergrheinfeld (DE); Georg Zink, Gerolzhofen (DE); Christoph Kleuker, Gochsheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/266,433

(22) Filed: Oct. 8, 2002

(65) Prior Publication Data

US 2003/0075412 A1 Apr. 24, 2003

(30) Foreign Application Priority Data

Oct. 9, 2001 (DE) ......................................... 101 49 703
Aug. 21, 2002 (DE) ......................................... 102 38 118

(51) Int. Cl.[7] ............................................. F16D 23/12
(52) U.S. Cl. ...................... 192/20; 192/48.8; 192/93 A; 192/94; 192/98; 192/115
(58) Field of Search ................................ 192/98, 93 A, 192/94, 110 B, 115, 48.8, 48.9, 48.91, 20, 84.6, 90

(56) References Cited

U.S. PATENT DOCUMENTS

| | | | | |
|---|---|---|---|---|
| 4,934,503 A | * | 6/1990 | Bacher et al. ............ | 192/93 A |
| 4,936,428 A | | 6/1990 | Leigh-Monstevens et al. | |
| 5,139,126 A | * | 8/1992 | Perez et al. .............. | 192/111 A |
| 5,141,091 A | * | 8/1992 | Perez et al. .............. | 192/93 A |
| 5,588,517 A | * | 12/1996 | Kooy et al. .............. | 192/70.25 |
| 5,669,480 A | * | 9/1997 | Kooy et al. .............. | 192/110 B |
| 5,806,646 A | * | 9/1998 | Grosspietsch et al. .. | 192/110 B |
| 5,996,754 A | * | 12/1999 | Reed et al. ............... | 192/93 A |
| 6,328,147 B1 | | 12/2001 | Fujita | |
| 6,691,850 B2 | * | 2/2004 | Aschoff et al. ........... | 192/94 |
| 2002/0065171 A1 | * | 5/2002 | Raber ........................ | 192/90 |
| 2002/0074206 A1 | * | 6/2002 | Grosspietsch et al. .... | 192/94 |

FOREIGN PATENT DOCUMENTS

| | | | |
|---|---|---|---|
| DE | 11 75 084 | 7/1930 | |
| DE | 195 47 081 | 6/1996 | ........... F16D/13/75 |
| DE | 199 14 937 A1 | * 10/1999 | |
| DE | 100 33 649 | 2/2001 | |
| DE | 100 35 516 | 1/2002 | ........... F16D/23/12 |
| EP | 0 478 427 | 4/1992 | ........... F16D/23/12 |
| WO | WO 02/50444 A1 | * 6/2002 | |

* cited by examiner

Primary Examiner—Rodney H. Bonck
(74) Attorney, Agent, or Firm—Cohen, Pontani, Lieberman & Pavane

(57) ABSTRACT

An actuating device for a friction clutch device installed in the drive train of a motor vehicle introduces actuating forces, especially clutch-engaging or clutch-releasing forces, to the friction clutch device to actuate at least one friction clutch of the friction clutch device in the engaging or releasing direction. At least one actuating element assigned to a friction clutch can be shifted axially relative to at least one support element, which is essentially fixed in the axial direction, to exert the actuating forces. The actuating element belongs to an actuator assigned to the clutch or can be shifted axially relative to the support element by the intermediate action of an actuator assigned to the clutch. The actuating element and the support element engage with each other in such a way that a rotational movement of the actuating element relative to the nonrotatably supported support element, this movement being imparted by the intermediate action of the actuator, is converted to an axial translational movement of the actuating element relative to the axially supported support element.

37 Claims, 19 Drawing Sheets

Fig.9
a)
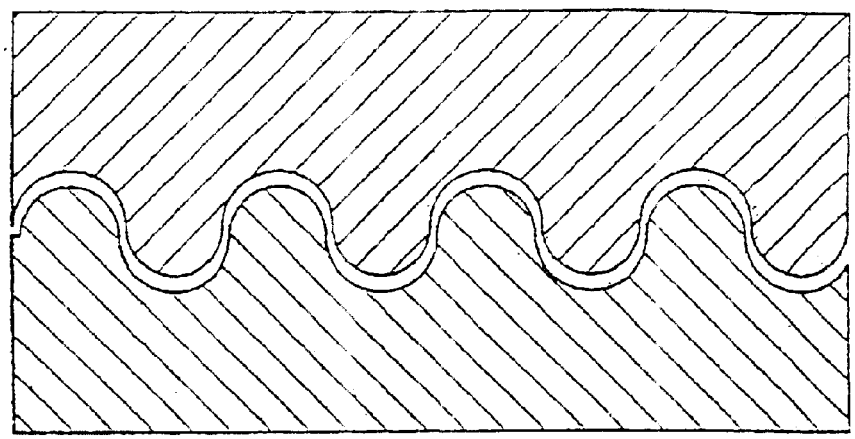
b)
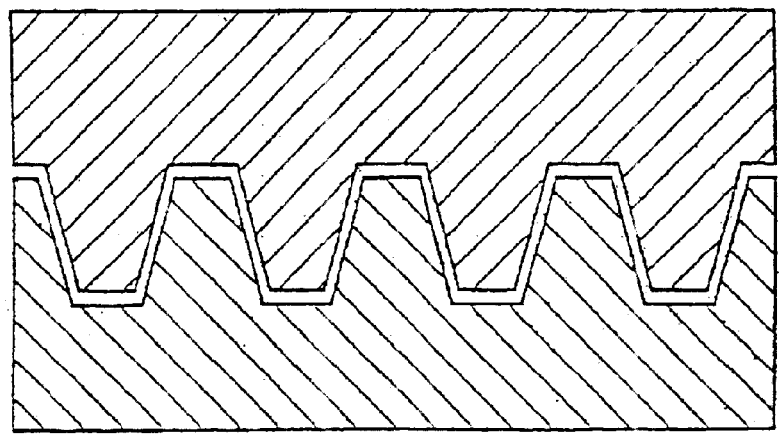

ACTUATING DEVICE FOR A FRICTION CLUTCH DEVICE, POSSIBLY A DUAL OR MULTIPLE FRICTION CLUTCH DEVICE

BACKGROUND OF THE INVENTION

1. Field of the Invention

The present invention pertains in particular (but not exclusively) to a so-called dual or multiple friction clutch device for installation in the drive train of a motor vehicle for the transfer of torque between a drive unit and a transmission, where the clutch device has a first friction clutch arrangement assigned to a first transmission input shaft and a second clutch arrangement assigned to a second transmission input shaft, and to a motor vehicle drive train equipped with this type of clutch device. With respect to the clutch device, the idea of the invention pertains primarily (but not exclusively) to so-called dual clutches of the friction disk type, for which it is known that an actuating device in the form of a hydraulic dual slave cylinder ("dual CSC") can be provided for the optional actuation of the first and/or of the second friction clutch arrangement to engage or release the clutch.

2. Description of the Related Art

The general goal is to provide an actuating device which makes it possible to actuate the two clutch arrangements independently of each other without occupying a great deal of space in the drive train. The hydraulic dual CSC's used up to now are quite compact, but they suffer from the disadvantage that pressurized hydraulic oil must be supplied to the transmission housing shroud, which can lead to problems associated with the leakage of oil. In particular, pulsating pressure loads on the seals lead to troublesome leaks, especially in the case of clutches of the so-called engaging type, that is, clutches of the NORMALLY OPEN type, upon which engaging forces must be exerted to engage the clutch.

Especially in the case of clutch arrangements of the NORMALLY OPEN type mentioned above, there is also the problem of how to absorb the axial forces which are produced in opposition to those exerted by the actuating arrangement and thus introduced into the clutch device. The absorption of these opposing forces by way of the power takeoff shaft (possibly the crankshaft) of the drive unit is problematic, because this can subject the bearings of the power takeoff shaft to excessive load. When conventional dual CSC's are used, however, it has been found that it is relatively difficult in terms of the design engineering involved to absorb the opposing forces in any other way.

SUMMARY OF THE INVENTION

Against the background sketched above, the invention proposes an actuating device for a multiple friction clutch device installed in the drive train of a motor vehicle, possibly a dual friction clutch device, for introducing actuating forces, especially engaging or disengaging forces, into the friction clutch device in order to actuate, as desired, a first and/or a second friction clutch arrangement of the friction clutch device in the engaging or releasing direction. The actuating device comprises at least one first actuating element assigned to the first friction clutch arrangement and at least one second actuating element assigned to the second friction clutch arrangement, which actuating elements can be shifted axially relative to at least one support element, which is essentially fixed in the axial direction, to exert the actuating forces. Each of these actuating elements belongs to an actuator assigned to the clutch arrangement in question or can be shifted axially relative to the support element by the intermediate action of an actuator assigned to the associated clutch arrangement. According to the invention, the first and the second actuating elements engage with the support element such that a rotational movement of the actuating element relative to the nonrotatably supported support element, this movement being imparted by the intermediate action of the associated actuator, is converted into an axial translational movement of the actuating element relative to the axially supported support element.

It has been discovered, however, that the inventive idea is also advantageous in conjunction with "single clutch arrangements", which have only one friction clutch arrangement. In accordance with a more general aspect, therefore, the invention proposes an actuating device for a friction clutch device installed in the drive train of a motor vehicle for introducing actuating forces, especially clutch-engaging or clutch-releasing forces, into the friction clutch device to actuate at least one friction clutch arrangement of the friction clutch device. At least one actuating element is assigned to the friction clutch arrangement or to a friction clutch arrangement, which element can be shifted axially relative to the minimum of one support element, which is essentially fixed in the axial direction, to exert the actuating forces. This actuating element belongs to an actuator assigned to the clutch arrangement or can be shifted axially relative to the support element by the intermediate action of an actuator assigned to the clutch arrangement. According to this more general aspect, the actuating element engages with the support element such that a rotational movement of the actuating element relative to the nonrotatably supported support element, this rotational movement being imparted by the intermediate action of the actuator, is converted to an axial translational movement of the actuating element relative to the axially supported support element.

The actuating device according to the invention can be produced compactly and at low cost. A high degree of functional (operational) reliability can also be achieved.

With respect to the way in which the actuating element or the actuating element in question engages with the support element, it is proposed that the engagement between the support element and the actuating element or between the support element and the first and/or the second actuating element be of the spindle or threaded type or that they engage with each other in the manner of a curve and its follower or of a ramp and a complementary ramp.

A preferred possibility is that one of the elements, i.e., either the support element or actuating element, have a single or double external thread extending around an outside circumferential surface with an essentially circular cylindrical shape, and that the other element have a single or double internal thread extending around an inside circumferential surface with an essentially circular cylindrical shape. The external thread and the internal thread are in direct, sliding engagement with each other or are in engagement with each other by the intermediate presence of at least one rolling or anti-friction element or of at least one sliding element. The internal thread and the external thread can be advantageously designed as flat threads, as trapezoidal threads, or as round threads. An embodiment with especially low friction is characterized in that the internal thread and the external thread cooperate with several balls serving as rolling or anti-friction elements and possibly with a ball return formed in the other element to form a ball screw. It is advantageous for the ball screw to be designed in accordance with U.S. published application no. 2002 074206.

An advantageous design variant is characterized in that one of the elements in question, i.e., either the support element or the (associated) actuating element, has a single or double external thread on an outside circumferential surface with an essentially circular cylindrical shape or a single or double internal thread on an inside circumferential surface with an essentially circular cylindrical shape. The other element has at least one thread engager supported axially on the first element, where the thread engager projects radially inward from an inner circumferential surface of the other element to engage in the external thread or projects radially outward from an outer circumferential surface to engage in the internal thread. The thread engager can be designed as a rolling or anti-friction element, for example, or as a sliding element. The thread engager is preferably guided with freedom of movement on the other element in an associated ring-shaped guide groove extending in the circumferential direction.

It is proposed as especially advantageous that the pitch of the external thread or the internal thread change in the axial direction. In this way, it is possible, for example, to obtain the desired relationship, such as a linear relationship, between the distance traveled by the actuator and the torque of the clutch, which is advantageous, for example, for the sake of good control performance (constant resolution). Nonlinear spring characteristics, such as the spring characteristics of the linings in particular, can be compensated by appropriately varying the pitch of the thread.

Another possibility for the engagement between the (associated) actuating element and the support element is to provide the support element and the (associated) actuating element with circumferential ramps, which rise axially in the circumferential direction; these ramps convert rotational movement into translational movement, possibly with the intermediate help of rolling elements. See, for example, DE 195 47 081 A1 and U.S. Pat. No. 5,141,091, the proposals of which can also be applied advantageously in conjunction with an actuating device according to the invention.

Another advantageous possibility is to provide one of the elements, i.e., either the support element or the (associated) actuating element, with at least one circumferential guide curve, which rises axially in the circumferential direction, whereas the other element has at least one curve follower, which is or can be brought into engagement with the guide curve, either directly or indirectly. This guide curve converts rotational movement into translational movement, possibly with the intermediate help of a plain bearing or an anti-friction bearing arrangement. The parts of an actuating element-support element arrangement of this type can be made of metal sheet or plate, for example, as a result of which manufacturing costs are significantly reduced.

The guide curve can rise axially in a linear manner in the circumferential direction. But is it also possible and advantageous for the guide curve to rise axially in a nonlinear manner in the circumferential direction, so as to obtain, for example, the desired relationship, especially an essentially linear relationship (see explanation above), between the distance traveled by the actuator and the torque of the clutch.

A preferred design of the actuating device is characterized in that at least one circumferential recess or opening defining the guide curve is provided in an outer circumferential surface and/or in an inner circumferential surface of the one element, which recess or opening serves as a link, in which the curve follower or an associated curve follower, designed as a link follower, can engage. It is not mandatory but preferred for the (associated) actuating element to have the guide curve or the link.

The support element and the actuating element or actuating elements can be designed as sleeves, possibly sleeves made of metal sheet or plate, which are coaxial to each other. The actuating element or at least one of the actuating elements can be formed by an outer sleeve, which extends radially around at least part of the outside surface of the support sleeve, which serves as the support element. In addition, the actuating element or at least one actuating element can be formed by an inner sleeve, where a support sleeve or the support sleeve which serves as the support element extends radially around at least part of the outside surface of the inside sleeve.

An especially advantageous embodiment of the actuating element but one which does not necessarily have to be used in conjunction with the design of the actuating element with a guide curve is characterized in that, as the support element, a radially outer support sleeve is provided on the outside and a radially inner support sleeve is provided on the inside, and in that the actuating element or at least one of the actuating elements is formed by an intermediate sleeve, which is installed radially between the outside support sleeve and the inside support sleeve. In reference to the design of an actuating device with a guide curve, the intermediate sleeve can be designed with at least one guide curve (preferably in the form of a link), which is or can be brought into engagement directly or indirectly with a curve follower extending radially between the outside support sleeve and the inside support sleeve. The follower can comprise a pin, which is attached to the outside support sleeve and/or to the inside support sleeve.

As previously mentioned, the support element and the actuating element or actuating elements can be designed as parts to be made of metal sheet or plate. This applies fundamentally to all of the design variants, but it is especially advisable for the design of the actuating device with at least one guide curve described above.

Another possibility is to design the support element and the actuating element or the actuating elements as plastic parts, where preferably one of the elements, i.e., the support element or the actuating element, or one of the elements of the support element plus actuating element pair in question is produced of a relatively flexible plastic, whereas the other element is made of a relatively rigid plastic. It can also be provided that one of the elements, i.e., the support element or the actuating element, or one of the elements of the support element plus actuating element pair in question, is made of metal, preferably of aluminum, whereas the other element is made of plastic.

With respect to the plastic material used, it is proposed that at least part of at least one or the other element be made of a lubricant-modified and/or self-lubricating plastic material. Friction-reducing materials which can be considered include, for example, PTFE in particular, but molybdenum phosphite and $MOS_2$ are also suitable. Examples include the plastics polysulfone containing 15% PTFE and polyphthalamide containing 15% PTFE (PTFE= polytetrafluoroethylene). Insofar as combinations of a rigid and a flexible material are to be provided (which should be the goal), material pairings such as a thermoset plus aluminum and a thermoset plus thermoplastic can be considered.

A translational actuator can be assigned to the (or to each) actuating element, which actuator is or can be connected to the actuating element for motion in common by a coupling mechanism for converting translational movement into rotational movement. For this purpose, it is proposed in particular that the coupling mechanism comprise a traction and/or a thrust element, which can be driven by the actuator in a translational sense, which element acts on the actuating element or a lever section thereof, and which can pivot in a plane essentially orthogonal to the axis of rotation. This traction and/or thrust element is used to transfer an essentially tangential actuating force to the actuating element. The actuator can be, for example, an actuator based on the principle of a hydraulic slave cylinder.

Another advantageous possibility is a rotary actuator is assigned to the (or to each) actuating element, which actuator is or can be connected to the actuating element for motion in movement in common either directly or by the intermediate means of a coupling mechanism. It is possible, for example, to consider a rotary actuator based on an electric motor.

The rotary actuator can have an output section, which has an axis of rotation which is at least approximately parallel to the axis of rotation of the actuating element. It can be advantageous to provide a toothed wheel gearing system, by means of which the actuator and the actuating element are or can be connected to each other for motion in common. For example, the toothed wheel gearing system can have a toothed wheel on the actuator side as the input part and a toothed wheel or toothed wheel sector or toothed rim or toothed rim sector on the actuating element side as the output part, where the input part can simultaneously form the output part of the actuator and the output part can be designed as an integral part of or as a one-piece unit with the actuating element.

Another advantageous possibility is for the actuator to have an output section with an axis of rotation at least approximately orthogonal to the axis of rotation of the actuating element. It can be advantageous for the actuator and the actuating element to be connected or connectable to each other for motion in common by way of a worm gearing system. The worm gearing system can have a worm on the actuator side as the input section and a toothed wheel or toothed wheel sector or toothed rim or toothed rim sector on the actuating element side as the output section, where the input section can simultaneously form the output section of the actuator and the output section can be designed as an integral part of or as a one-piece unit with the actuating element.

Regardless of the way in which the actuator works and regardless of the means used to connect the actuator to the actuating element, it is also proposed as a further elaboration that an arresting device, possibly designed as a friction brake, be assigned to an output section or to the output section of the actuator and/or to a torque-transferring component of the connecting mechanism or of the transmission and/or to the actuating element. The arresting device is designed so that, regardless of the status of the actuation of the actuator at any one moment, the arresting device can preserve the instantaneous state of clutch actuation corresponding to the instantaneous axial and rotational position of the actuating element. As a result, the instantaneous state of clutch actuation can be preserved even if the current being supplied to the actuator, which is in the form of an electric motor, for example, is cut off. The arresting device can be activated and deactivated by means of, for example, an electromagnetic control element, which brings a friction brake into frictional engagement with an associated component or which releases this frictional engagement. The control element should be designed so that, when the current fails, the arresting function is necessarily activated or the existing state of activation is maintained.

It should also be remarked that the arresting function can also be an inherent property, so that there is no need for a separate arresting device. For example, a coupling mechanism such as a worm gearing system can be designed to be self-locking. In particular, it is possible for the frictional forces exerted by an arresting device designed as a friction brake to work together with inhibiting forces in the coupling mechanism and/or in the actuator to provide the previously described arresting function, that is, to hold the instantaneous state of clutch actuation independently of the instantaneous activation state of the actuator.

For the function of the actuating device, it is important for the support element to be secured against rotation. There are in principle many possible ways in which the support element can be secured in this way. The support element preferably has at least one rotational support section which is or can be brought into positive rotational support engagement with at least one assigned opposing rotational support section of a support base, which is stationary with respect to the clutch device, especially into engagement with the housing of the transmission of the drive train, in order to secure the support element against rotation. In addition, the support element can have at least one axial securing section, which is or can be brought into positive axial securing engagement with at least one assigned opposing axial securing section of a support base, which is stationary with respect to the clutch device, especially into engagement with the housing of the transmission of the drive train, in order to secure the support element in the drive train in the axial direction. In this context, it is especially preferred that the rotational support section and the opposing rotational support section simultaneously serve as the axial support section and as the opposing axial support section. An advantageous design is characterized in that the rotational support section and the opposing rotational support section can be brought into engagement in the manner of a quarter-turn fastener.

When the "axial securing" of the support element is mentioned above, it does not necessarily mean that the opposing axial forces which act on the support element during the clutch actuation process are absorbed via the axial securing section of the support base. It is preferable for these opposing axial forces to be absorbed in the clutch device, preferably in such a way that the opposing axial forces which develop in the clutch device and the opposing axial forces which develop in the actuating element cancel each other out, at least partially, preferably essentially completely, as will be explained in greater detail below.

It is advantageous for the actuating device according to the invention to have an actuating unit which can be handled as a single unit and which comprises at least one support element and the minimum of one actuating element.

In accordance with a second aspect, the invention pertains generally to an actuating unit for a friction clutch device installed in the drive train of a motor vehicle between a drive unit and a transmission for introducing actuating forces, especially clutch-engaging or clutch-releasing forces, into the friction clutch device to actuate at least one friction clutch arrangement of the friction clutch device for the purpose of engaging it or releasing it, together with an associated transmission-side mount. The actuating unit comprises at least one actuating element assigned to the friction clutch arrangement or a friction clutch arrangement, which actuating element can be shifted axially relative to at least one support element, which is essentially fixed in the axial direction, to exert the actuating forces. The actuating element belongs to an actuator assigned to the clutch arrangement or can be shifted axially relative to the support element by the intermediate action of an actuator assigned to the clutch device. The transmission-side mount provides a securing function for the actuating unit against rotation during the actuation of the clutch and, if desired (if provided), allows the actuating unit a certain freedom of axial movement relative to the transmission. The actuating unit being discussed can be an actuating unit according to the invention as described under the first aspect of the invention or a conventional actuating device. In the case of a single clutch, the conventional device could be based on a single hydraulic slave cylinder (single CSC), or, in the case of a dual clutch, it could be based on a dual hydraulic slave cylinder (dual CSC).

It is known that the side of the actuating unit facing the transmission can be mounted by means of a number of pins, such as three pins, which project axially from the transmission. These pins can allow the actuating unit to move to a certain limited extent in the axial direction relative to the transmission. If, during the actuation of the clutch, a reaction torque which tries to rotate the actuating unit is produced by the tangential actuation of a ramp engager or the like, or if a driving torque acting in the rotational direction is produced by the rotation of the clutch, these pins can absorb the reaction torque or the driving torque and thus prevent the actuating unit (which could possibly also be called an actuating module) from rotating relative to the transmission.

The conventional approach is disadvantageous to the extent that the pins can be subjected to very heavy loads under certain conditions. In addition, there is usually a relatively stiff connection between the actuating unit and the transmission and, via the actuating unit, between the transmission and the associated clutch device, as a result of which vibrations or stresses such as those which result from an axial offset between the drive unit (engine) and the transmission can occur in the actuating unit. This can cause the natural wobbling frequency of the overall arrangement to increase, which is usually undesirable.

A further disadvantage of the conventional solution is that, when the actuating unit is to be installed in the drive train, it often proves difficult to thread the actuating unit onto the transmission-side pins. Although it appears possible in principle to design the pins and the associated receiving holes in the actuating device with insertion bevels and/or with a comparatively large amount of clearance, this conceivable solution must usually be rejected in practice because it is necessary to ensure a certain minimum supporting length or load capacity, which would occupy too much space.

The task of the invention is to provide an actuating unit together with the transmission-side mount of the general type discussed above which avoids the problems or disadvantages associated with the conventional approach explained above or which at least significantly lessens their impact. To accomplish this task, the transmission-side mount has a mounting receptacle, which is or can be attached nonrotatably to the transmission, into which receptacle a plug-in section of the actuating unit, which is connected directly or indirectly to the support element or is an integral part thereof and the cross section of which is adapted to the shape of the mounting receptacle, is or can be inserted axially, where the mounting receptacle has at least one internal surface on which at least one external surface of the plug-in section can be secured directly or indirectly against rotation.

By providing a direct or indirect supporting engagement between the inside surface of the mounting receptacle and the outside surface of the plug-in section, the mount according to the invention, into which the plug-in section of the actuating unit is or can be inserted axially, makes it possible to secure the actuating unit against rotation relative to the transmission. If these surfaces are designed appropriately, they can absorb high overall supporting forces without the load per unit area being excessive at any one point. In principle, the actuating unit can be freely movable in the axial direction, so that the actuating unit, possibly together with an associated clutch module, can copy the axial movements which can result, for example, from the axial play of the crankshaft without the occurrence of undesirable axial loads on, for example, the crankshaft.

The actuating unit or actuating unit/mount combination according to the invention is especially useful for a friction clutch design of the NORMALLY OPEN type, but it can also be used advantageously in a friction clutch device of the NORMALLY CLOSED type.

It is advantageous to design the inside surface and the outside surface so that the actuating unit can be centered on the transmission by means of direct or indirect centering engagement between the inside surface and the outside surface.

An especially preferred embodiment is characterized by mating the inside surface and the outside surface to each other in such a way that the actuating unit retains some freedom of movement at least in the radial direction. As a result, an axial offset between, for example, the drive unit (engine) and the transmission can be absorbed without any stress, as explained above. In this relationship, but also in general, it is also proposed that the components be supported or the centering engagement accomplished by means of at least one elastic intermediate element. By means of the elastic intermediate element, the actuating unit can be pretensioned into a centering position defined by the transmission-side mount while compensating for axial offsets or the like at the same time.

For an especially reliable and easy-to-produce engagement between the mount and the actuating unit which also avoids high loads per unit area, it is proposed that the inside surface and the outside surface extend radially at least part of the way around the outside of an exit area for at least one transmission input shaft, preferably extending over a total circumferential angle of at least approximately 90°, more preferably of at least approximately 180°, and most preferably of at least approximately 270°. The inside surface and the outside surface should in this case proceed in the circumferential direction in such a way they provide support over the largest possible fraction of this angle, preferably over the entire circumferential angle, which therefore means that, to provide the means of preventing rotation, certain areas of the inside surface and of the outside surface will deviate from a circular cylindrical course relative to the axis of rotation. Ideally, the inside surface and the outside surface are designed in such a way that there is only one relative rotational position or one range of relative rotational positions between the mount and the actuating unit in which they can engage with each other.

So that the plug-in section of the actuating unit can be inserted easily into the transmission-side mount, at least a certain part of the inside surface of the transmission-side mount can be designed to serve as a threading-in surface, by means of which the axial movement of the actuating unit to be installed, which comes in contact with this surface, can be transformed into a radial movement of the actuating unit, which brings the actuating unit closer to the nominal radial position. The threading-in surface is preferably also designed to cooperate with the shape of the plug-in section in such a way that, to a certain extent, the axial movement of the actuating unit can be converted to a rotational movement, which brings the actuating unit closer to the nominal rotational position.

An effective embodiment is characterized in that the receptacle has at least one mount wall with the inside surface, which extends radially at least part of the way around the outside of an exit area or the exit area for at least one transmission input shaft. The plug-in section of the actuating unit can have at least one engagement area, which projects radially beyond the support element and which is preferably designed as a flange, on which the outside surface is formed. The transmission-side mount can be an integral part of the transmission housing and can be designed as, for example, an appropriate trough in the transmission housing or comprise at least one mount wall, constituting an integral part of the transmission housing and projecting from it. Preferably, however, the transmission-side mount is designed as a separate component or as a separate assembly, which is or can be attached permanently to the transmission so that it has no freedom of rotation and preferably also no freedom of axial movement.

In general, it is preferable for the mount to be designed as a one-piece, continuous part. It is effective to design the mount as a shell-like component. A mount of this type can be aptly called a "mounting shell" or "mounting basket".

The plug-in section can be an integral part of the support element or form a single unit with it, but it is preferably a separate part or a separate assembly which is independent of the support element and which is or can be permanently attached to the support element so that it has no freedom of rotation and preferably also no freedom of axial movement.

It is advantageous for the actuating unit according to second aspect being discussed here to be designed in agreement with the above-discussed inventive proposals and inventive elaborations according to the first aspect of the invention. It is therefore possible for the actuating element and the support element to engage with each other in such a way that a rotational movement of the actuating unit relative to the nonrotatably supported support element, this rotational movement being imparted by the actuator, is converted to an axial translation of the actuating element relative to the axially supported support element.

The actuating unit can be provided for a single friction clutch device. In this case, the actuating unit will usually comprise precisely one actuating element. In addition, the actuating unit can be provided for a multiple friction clutch device, especially a dual friction clutch device, and thus makes it possible to actuate, as desired, the first or the second friction clutch arrangement of the friction clutch device in the engaging or releasing direction. For this purpose, the actuating unit can have at least one first actuating element assigned to the first friction clutch arrangement and at least one second actuating element assigned to the second friction clutch arrangement. These actuating elements can be shifted axially relative to the support element or to at least one support element, which is essentially fixed in the axial direction, to exert the actuating forces, where each of the actuating elements belongs to an actuator assigned to the associated clutch arrangement or can be shifted axially relative to the support element by the intermediate action of an actuator assigned to the clutch arrangement in question. In accordance with the first aspect of the invention, the first and second actuating elements engage the support element in such a way that a rotational movement of the actuating element relative to the nonrotatably supported support element, this rotational movement being imparted by the intermediate action of the associated actuator, is converted to an axial translational movement of the actuating element relative to the axially supported support element.

Further elaborative proposals can be derived from the proposals presented above for elaborations of the actuating device of the invention according to the first aspect of the invention.

The invention also pertains to an actuating unit for a combination according to the invention (actuating unit together with the transmission-side mount). Reference is made herewith to the features of the inventive combination according to the preceding explanations referring to the actuating unit.

The invention also pertains to a transmission-side mount for a combination according to the invention (actuating unit together with the transmission-side mount). Reference is herewith made to the features of the inventive combination according to the preceding explanations referred to the transmission-side mount.

The invention also pertains specifically to a clutch device, possibly to a dual or multi-clutch device, for installation in a motor vehicle drive train between a drive unit and a transmission. The clutch device includes a housing arrangement, which is or can be connected to a drive element for rotation in common around an axis of rotation; at least one clutch arrangement, assigned to a transmission input shaft, this clutch arrangement having at least one pressure plate, by means of which at least one friction area of at least one clutch disk can be pressed against an opposing support area, which can rotate along with the housing arrangement; an actuating arrangement for engaging and releasing the clutch arrangement by the intermediate action of an actuating element of the actuating arrangement assigned to the clutch arrangement, which actuating element can be shifted axially relative to at least one support element of the actuating arrangement, the support element being essentially fixed in the axial direction, where the actuating element belongs to an actuator assigned to the clutch arrangement or can be shifted axially relative to the support element by the intermediate action of an actuator assigned to the clutch arrangement. According to the invention, it is proposed that the actuating arrangement comprise an actuating device or an actuating unit according to the invention which includes the actuating element and the support element, possibly together with the associated transmission-side mount, as described above.

In the conventional case, the opposing axial forces resulting from the axial displacement of the actuating element relative to the support element and the opposing forces resulting from the transfer of the axial control and/or positioning forces are supported independently of each other. According to the conventional approach, for example, a clutch-release bearing arrangement and its associated actuator (such as a hydraulic slave cylinder) are supported axially on the transmission, whereas the clutch device is supported on the power takeoff shaft (especially the crankshaft). When a hydraulic slave cylinder is being used as the actuator, it is possible to interpret the piston element and the associated clutch-release or clutch-engaging bearing as the actuating element and the cylinder body defining the cylindrical space as the support element.

In conjunction with so-called multi-clutch devices, especially dual clutch devices with several clutch arrangements, it appears advantageous to depart from the "NORMALLY CLOSED" design, which so far has been the dominant design for clutches of the friction disk type, and to adopt the "NORMALLY OPEN" design. This means that, while the vehicle is being driven, axial clutch-engaging forces must be absorbed continuously. If this axial support occurs directly or indirectly via the power takeoff shaft of the drive unit, the bearings of the power takeoff shaft could be subjected to excessive load over the long term.

In contrast, especially for the design of the clutch device with at least one clutch arrangement of the NORMALLY OPEN type, but also for a design of the clutch device with at least one clutch arrangement of the NORMALLY CLOSED type, the axial control and/or positioning forces exerted by the actuating element in correspondence with its axial position are transferred to the pressure plate and/or to a spring arrangement assigned to the pressure plate. The opposing axial forces induced during the axial shift of the actuating element relative to the support element and/or during the buildup of the axial control and/or positioning forces are absorbed by way of the support element; and the opposing axial forces induced by the transferred axial control and/or positioning forces are absorbed by the housing arrangement. The support element and the housing arrangement are supported axially with respect to each other in such a way that the opposing axial forces are absorbed by the housing arrangement and the opposing axial forces are absorbed by the support element cancel each other out at least partially and preferably cancel each other out almost completely. According to the invention, the opposing axial forces cited above cancel each other out at least partially, so that the power takeoff shaft is subjected at most to only light axial loads. Ideally, the axial support relationship between the support element and the housing is such that a closed circuit is obtained for the flow of axial forces within the clutch device.

An advantageous embodiment is characterized in that a pivot bearing arrangement is provided between a preferably cover-like section of the housing arrangement and the support element, possibly designed in the form of a sleeve, to transfer axial forces between the cover section of the housing and the support element. The actuating arrangement can have an actuating lever arrangement or an actuating spring arrangement assigned to the pressure plate, this lever or spring arrangement possibly being attached to the housing section. It is proposed as an elaboration that a support area which rotates in common with the housing arrangement be assigned to the actuating lever or actuating spring arrangement, on which support area the actuating lever or actuating spring arrangement is or can be axially supported directly or indirectly.

It is advantageous for the housing arrangement, the minimum of one clutch arrangement, and the actuating arrangement to form a single installation unit.

The invention also pertains to a clutch device, possibly a dual clutch or multi-clutch device, for installation in a motor vehicle drive train between a drive unit and a transmission, comprising at least one multi-disk clutch arrangement, which is assigned to a transmission input shaft and is provided for operation by the action of a operating fluid, especially a cooling oil, and an actuating device or actuating unit, which is or can be brought into working connection with the clutch arrangement and which, if desired, can be integrated into the clutch device, for engaging and releasing the clutch arrangement by the intermediate action of an actuating element of the actuating device or actuating unit assigned to the clutch arrangement. The actuating element can be shifted axially relative to at least one support element, essentially fixed in the axial direction, of the actuating device or actuating unit, and belongs to an actuator assigned to the clutch arrangement or can be shifted axially relative to the support element by the intermediate action of an actuator assigned to the clutch arrangement. The actuating device or actuating unit in question is an actuating device or actuating unit according to the invention, possibly with the associated transmission-side mount described above.

An especially preferred embodiment of the clutch device is characterized in that operating fluid can be supplied or, during operation, forcibly supplied at least to the areas where the support element and the (associated) actuating element engage with each other, by which mutual engagement the rotational movement is converted to the translational movement, the effect thus being to provide these engaging areas with wet lubrication. This wet lubrication makes it possible to reduce friction to an especially low level.

The clutch devices discussed above can be a multi-clutch device or a dual clutch device, each of which has a first clutch arrangement assigned to a first transmission input shaft and a second clutch arrangement assigned to a second transmission input shaft. Depending on the type of clutch, the clutch arrangement in question is, for example, a clutch arrangement of the friction disk type or a clutch arrangement of the multi-disk type.

The invention also pertains to a motor vehicle drive train with a clutch device installed between a drive unit and a transmission, which clutch device has an actuating device or actuating unit according to the invention (possibly with the associated transmission-side mount) or to which is assigned an actuating device or actuating unit according to the invention (possibly with the associated transmission-side mount). The invention is particularly concerned with the clutch devices according to the invention discussed above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1a shows a partial sectional view of a first exemplary embodiment of a dual clutch according to the invention of the friction disk type, which has an actuating module according to an embodiment of the invention supported axially on a clutch housing, which module serves to actuate the two friction disk clutch arrangements of the dual clutch and is integrated into this unit, whereas FIG. 1b shows part of a corresponding sectional view along a different sectional plane of the dual clutch containing the axis of rotation;

FIGS. 9a and 9b show two designs of threads acting between an actuating sleeve and the support sleeve of an embodiment of the actuating module to convert a rotational movement of the actuating sleeve in question into an axial movement of the actuating sleeve;

FIG. 16a is an axial cross-section of the actuating module of FIG. 15 in the assembled state, mounted on a transmission-side mounting receptacle;

FIG. 16b is a transverse section along line B—B of FIG. 16a;

FIG. 18a is a plan view of a mounting part which can be mounted on the transmission housing, in each case with an elastomeric inlay inserted into the mounting part;

FIG. 18b is a sectional view along line B—B of FIG. 18a;

FIG. 18c is a magnified view of a detail in area C of FIG. 18b;

FIG. 19a is a plan view of the mounting part without the elastomeric inlay;

FIG. 19b is a sectional view along line B—B of FIG. 19a;

DETAILED DESCRIPTION OF THE PRESENTLY PREFERRED EMBODIMENTS

Figure 2:
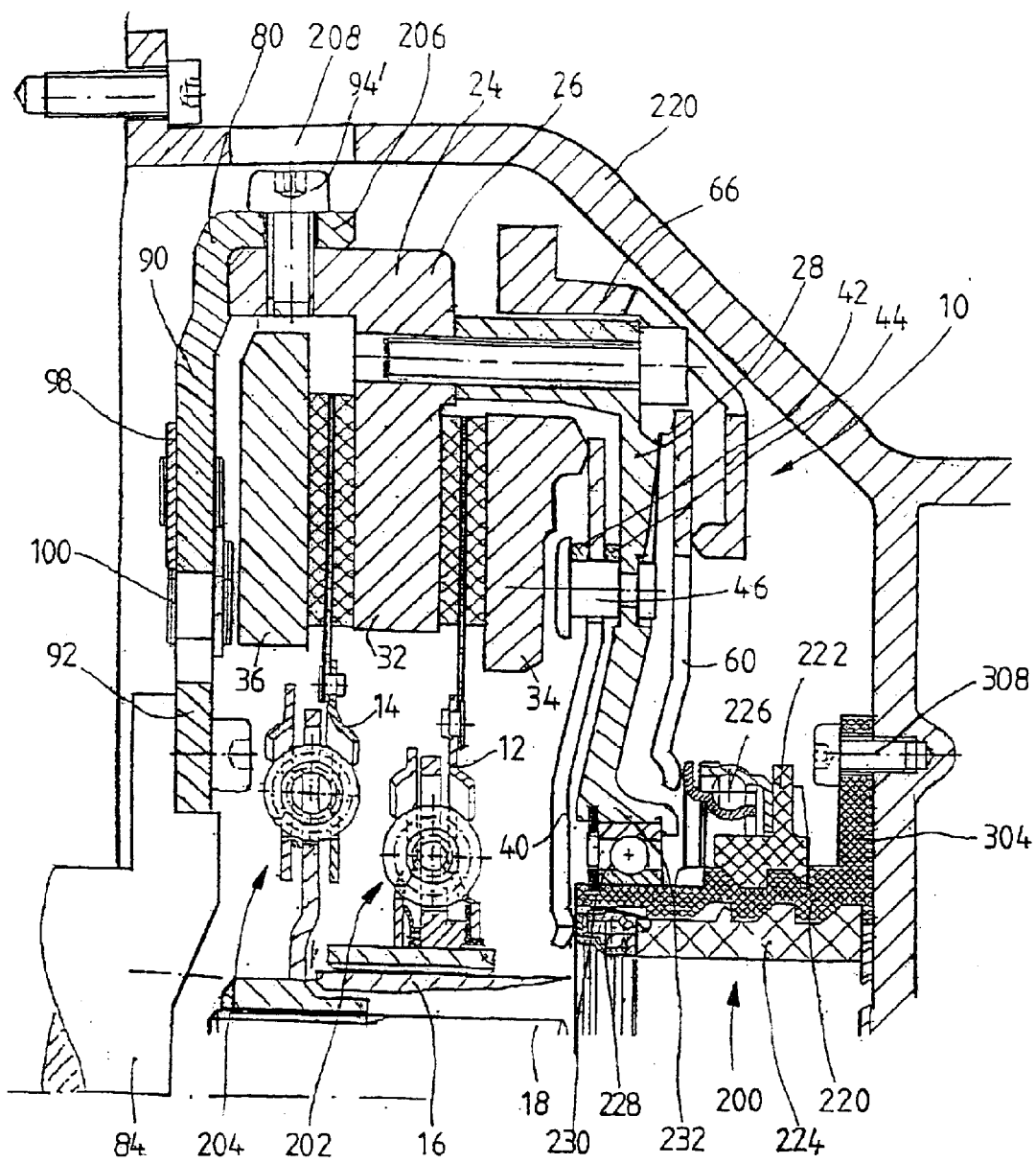
FIG. 2 shows another exemplary embodiment of a dual clutch similar for the most part to the example of FIG. 1, after it has been installed in the drive train of a motor vehicle.
Figure 3:
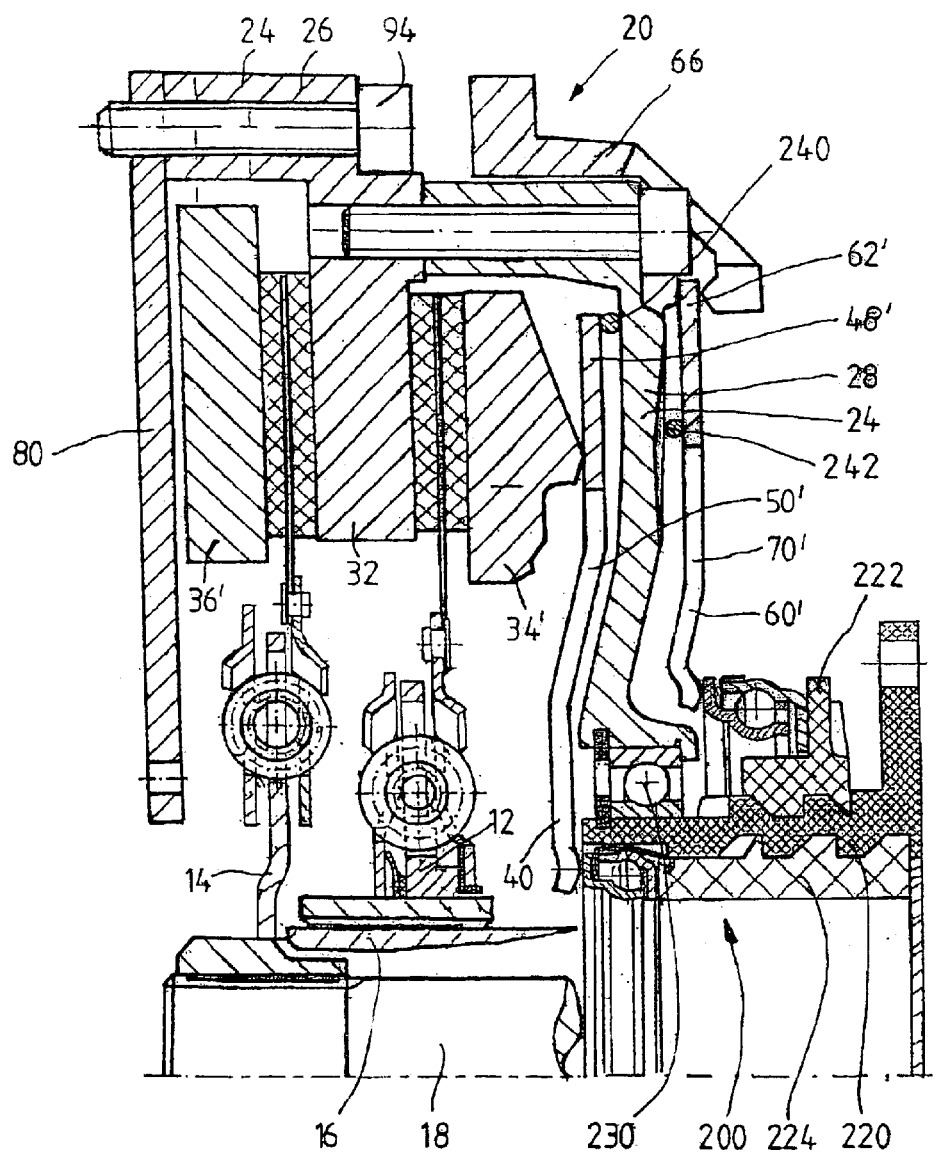
FIG. 3 shows a design variant of the dual clutch of FIG. 1.
Figure 4:
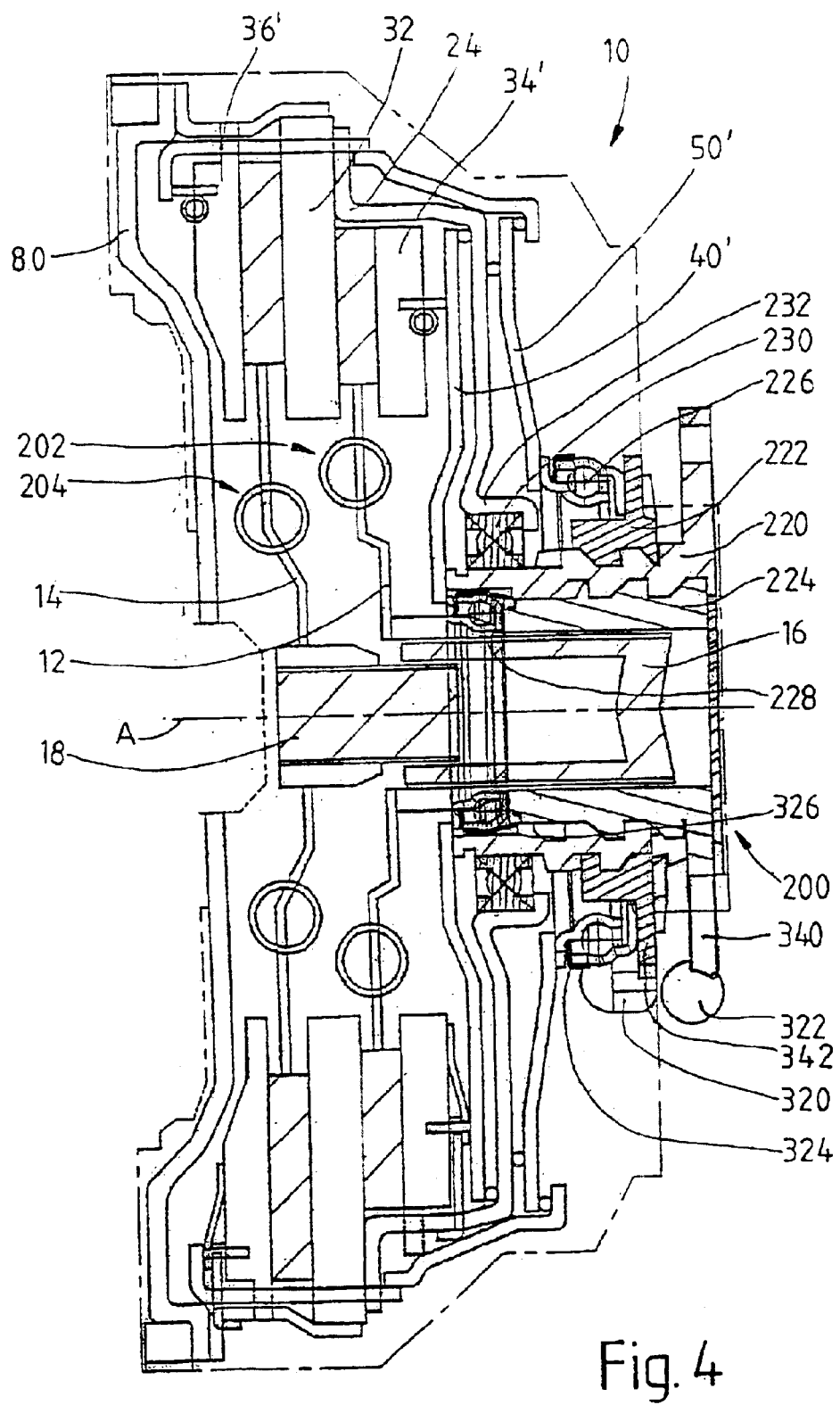
FIG. 4 shows an overall schematic sectional view of a dual clutch of the friction disk type similar for the most part to the dual clutch of FIG. 3.

Various aspects of the invention are explained in greater detail below on the basis of special exemplary embodiments, namely, so-called dual clutches of the friction disk type, where, in the case of the exemplary embodiments of FIGS. 1 and 2, the dual clutches are of the NORMALLY CLOSED type, which are actuated by pushing, whereas the exemplary embodiments according to the invention shown in FIGS. 3 and 4 are dual clutches of the NORMALLY OPEN type, which are actuated by pushing. The aspects of the invention in question, however, are independent of the type of clutch and of the way in which it is actuated. The various inventive aspects can be implemented both in the case of simple clutches (with only one clutch arrangement) and in the case of dual clutches (or, in general, multi-clutch devices with two or more clutch arrangements), namely, both in the case of clutches of the NORMALLY OPEN type and those of the NORMALLY CLOSED type, and independently of the type of actuation, namely, both in the case of clutches which are actuated by pushing and those which are actuated by pulling. At least some of the aspects of the invention can also be of interest in conjunction with wet-running simple and dual clutches of the multi-disk type.

Figure 1:
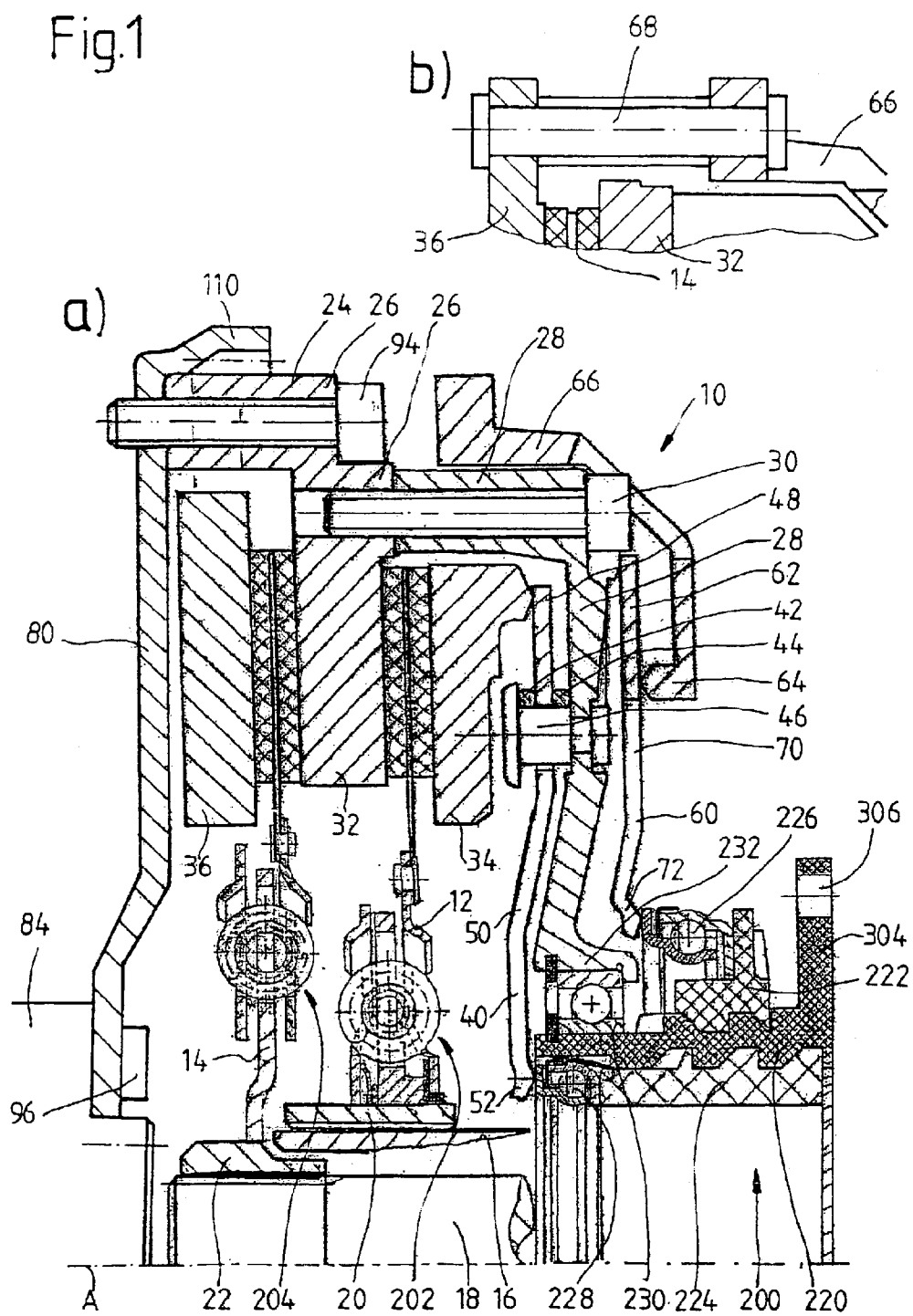

FIG. 1 shows a dual clutch 10 of the friction disk type, which has a first clutch disk 12 of a first clutch arrangement and a second clutch disk 14 of a second clutch arrangement. The first clutch disk 12 is connected in an effectively torque-transferring manner known in and of itself to a first transmission input shaft 16, designed as a hollow shaft; and the second clutch disk 14 is connected in a similar manner to the second transmission input shaft 18, which extends coaxially through the first transmission input shaft 16. The clutch disks, which are designed with integrated torsional vibration dampers 202 and 204, have, for example, connecting hubs 20, 22, which are pushed onto the transmission input shafts in question and connected nonrotatably to them by driver formations.

The dual clutch 10 has a housing arrangement 24, which comprises a first housing part 26 and a second housing part 28, which are connected to each other by threaded bolts 30.

A ring-shaped section of the first clutch disk 12 carries friction linings on both sides and is installed axially between a pressure plate section 32 of the housing part 26, forming an opposing support for the clutch disk, and a first pressure plate 34, held in the housing arrangement with freedom of axial movement. The ring-shaped area of the second clutch disk 14 carrying the friction linings is held axially between the pressure plate section 32 forming an opposing support for the clutch disk and a second pressure plate 36, held in the housing arrangement with freedom of axial movement. The two pressure plates 34, 36 are held in the housing arrangement by tangential springs (tangential leaf springs) or the like in a manner known in and of itself and are held under pretension acting in the opening or release direction.

A first disk spring or diaphragm spring 40, which is supported by support rings 42, 44 and centering bolts 46 on a radially inward-projecting, ring-shaped section of the second housing part 28, acts on the first pressure plate 34.

FIG. 1 shows the first diaphragm spring 40 in the actuated state. In this state, the ring-shaped section 48 of the diaphragm spring 40 acts in the closing or clutch-engaging direction on the first pressure plate 34, so that this plate is pressed against the first clutch disk 12 with maximum pressure, the clutch disk therefore being clamped at maximum pressure between the opposing support of the pressure plate section 32 and the pressure plate 34. The first clutch arrangement is therefore completely engaged. To release the first clutch arrangement, the actuating tongues or actuating levers 50 of the diaphragm spring 40 must be deflected toward the drive unit, that is, toward the left in FIG. 1, by the application of appropriate axial forces on their end sections 52. The diaphragm spring then pivots between the support rings 42 and 44, which form a pivot bearing, so that the axial forces acting on the pressure plate 34 are reduced, and the pressure plate 34 can move axially toward the right under the action of its spring-loaded pretension; that is, the clamping forces acting on the clutch disk 12 are reduced.

The second pressure plate 36 has a second diaphragm spring or disk spring 60, the ring-shaped section 62 of which is clamped between support sections of the first housing part 28 and a ring-shaped support section 64, forming a defined support radius, of a force-transferring element 66, designed as a ring-shaped part, which is connected by way of connecting bolts 68, serving as tension rods, to the second pressure plate 36. In the state shown in FIG. 1, the second diaphragm spring 60 presses the force-transferring element 64 toward the transmission, that is, toward the right in FIG. 1, as a result of which the second pressure plate 36 is pressed against the second clutch disk 14, and the clutch disk is accordingly clamped axially between the pressure plate 36 and the pressure plate section 32. FIG. 1 shows the state of maximum engagement for the second clutch arrangement also. To release the second clutch arrangement, appropriate axial forces are applied to the actuating tongues or actuating levers 70 to deflect their end sections 72 toward the drive unit, that is, toward the left in FIG. 1.

In the exemplary embodiment according to FIG. 1, the dual clutch 10 is connected by a flexplate 80 to the power takeoff shaft 84 of a drive unit, especially an internal combustion engine. In contrast to what is shown in FIG. 1, the dual clutch could be connected to the power takeoff shaft by a dual-mass flywheel or by a simple flywheel. Under certain conditions (corresponding to the exemplary embodiment shown in FIG. 1), it would be possible to omit a dual-mass flywheel or a simple flywheel, especially because the pressure plate section 32 and the pressure plates 34 and 36 represent in themselves a comparatively large rotational mass, which could therefore serve a flywheel mass. This rotational mass of the dual clutch can thus form a simple (rigid) flywheel mass or, if a dual-mass flywheel is desired, it can form the secondary rotational mass of the dual-mass flywheel.

The clutch arrangements can be actuated by an actuating module 200, which belongs to the dual clutch. The actuating module has a central sleeve 220, attached to the transmission housing to secure it in particular against rotation; the central sleeve carries an outer sleeve 222 and an inner sleeve 224. The outer sleeve 222 is engaged by an internal thread, the inner sleeve 224 by an external thread, to the central sleeve 220 in such a way that a rotation of the outer sleeve and/or of the inner sleeve relative to the central sleeve causes the sleeve in question (outer sleeve or inner sleeve) to shift in the axial direction. The outer sleeve 222 is provided with a clutch-release bearing 226, and the inner sleeve 224 is provided with a clutch-release bearing 228, across which, by the intermediate action of the outer sleeve and the inner sleeve, axial forces can be exerted on the tongues of the diaphragm springs 40, 60 in order to deflect the actuating tongues of the diaphragm spring in question toward the drive unit and thus to actuate the first and/or the second clutch arrangement in the release direction. So that an appropriate rotational movement in the clutch-release or clutch-engaging direction can be imparted to the outer sleeve and the inner sleeve, the sleeves can be designed with, for example, axially projecting lever arms, on each of which a specially assigned control element acts.

So that the axial forces flow around a closed circuit within the structural unit comprising the dual clutch 10 itself and the actuating module 200, the central sleeve 220 is in an axial support relationship with the second housing part 28, which holds the first diaphragm spring 40 by way of support rings 42, 44 and the positioning or retaining bolts 46. For this purpose, the second housing part 28 extends radially inward up to a radial and axial bearing 230, which is mounted radially between the central sleeve 220 and an inside circumference of a ring-shaped section 232 of the housing part 28. The bearing is secured in place axially by ring-shaped collars or lock washers or the like on the ring-shaped section 232 and the central sleeve 220.

An important aspect of the exemplary embodiment is that, because of the closed circuit around which the axial forces flow within the overall module comprising the dual clutch 10 itself and the actuating module 200 in conjunction with the actuation of the clutch, there are no axial forces which can act on the power takeoff shaft, especially on the crankshaft 84, of the drive unit, forces which could represent an excessive load on the bearings. The axial support is advantageously provided by a central support bearing, e.g., by the bearing 230 in the present case, between the actual clutch device itself and the associated actuating unit.

Before the dual clutch is integrated into the drive train, the actuating module 200 can be connected to the dual clutch 10 itself to form an installation unit, which can then be pre-mounted as a single assembly in the transmission shroud on the transmission side. On the engine side, the flexplate 80 (or in general a flexplate arrangement) is preseated on the connecting end of the power takeoff element 84, especially on the end of the crankshaft 84, or alternatively on a flywheel. In the process of attaching the transmission to the engine, the clutch module and the flexplate arrangement 80 approach each other and can then be connected to each other through the minimum of one opening 208 in the transmission shroud.

The flexplate 80 can be advantageously designed with an integrated starter toothed rim (at 110), which could, for example, be rolled into a radially outer, ring-shaped collar of the flexplate, which is bent in the axial direction. It would also be possible to shape other areas (areas consisting of metal sheet or plate) of the flexplate or of the ring-shaped part in order to provide TDC (Top Dead Center) markings for the engine control system. An advantage of the solution proposed here is the one-piece and therefore low-cost design of the starter toothed rim and/or of the other areas. In particular, problems are avoided which could occur when a separate toothed rim must be attached to a flexplate or to a flexplate arrangement.

FIG. 2 shows another exemplary embodiment of a dual clutch of the friction disk type according to the invention together with the associated actuating module 200. In place of a simple flexplate, a multi-part flexplate arrangement 80 is provided, which has a radially outer ring-shaped part 90, a radially inner central or hub part 92, and elastic connecting parts 98, 100, which both join the ring to the hub, the arrangement again being attached directly to the power takeoff shaft 84. The present exemplary embodiment also makes no use of a dual-mass flywheel. The clutch disks 12, 14 are therefore not designed to be essentially rigid in the direction of rotation but are designed instead with integrated torsional vibration dampers 202, 204. With respect to the manner in which the radially outer ring-shaped part 90 is connected to the clutch housing 24, FIG. 2 shows that a radially oriented screw joint is provided, where several connecting screws 94' are used between an axial collar section 206 of the ring-shaped part 90 and the first housing part 26. The radial screw joint according to FIG. 2 is very easy to establish by the use of at least one assigned opening 208 in the transmission housing shroud 210. Several of these openings 208 are preferably provided at various points around the circumference to limit or eliminate the need to turn the engine during the assembly process.

FIG. 3 shows a design variant in which, again, a simple (conventional) flexplate 80 is provided to connect the dual clutch 10 to the power takeoff shaft of the drive unit. Like the exemplary embodiment of FIGS. 1 and 2, the dual clutch 10 is combined with an actuating module 200 to form a single installation unit, and the axially and radially acting pivot bearing 230 establishes an axial support relationship between the central sleeve 220 of the actuating module and the housing part 28 to create a closed circuit for the flow of axial forces. Thus, as also in the case of the exemplary embodiments of FIGS. 1 and 2, upon deflection of the diaphragm springs, the opposing axial forces supported against the housing are absorbed by the central sleeve 220, so that these opposing axial forces and the other opposing axial forces acting between the central sleeve 220 and the outer sleeve 222 or inner sleeve 224 essentially cancel each other out.

In contrast to the previously described exemplary embodiments, the dual clutch 10 of FIG. 3 is a clutch of the NORMALLY OPEN type. FIG. 3 shows the first and the second clutch arrangements in the released state. For each of the two diaphragm springs 40' and 60', a pivot support is provided on the housing part 28 in the form of support rings 240, 242. The diaphragm springs 40', 60' act primarily as actuating levers, which are deflected toward the drive unit by the intermediate action of the outer sleeve 220 and the inner sleeve 224 and thus pivot around the support rings 240, 242 to engage the clutch. As the diaphragm spring 40' pivots, the lower part of the ring-shaped section 48' of the diaphragm spring 40' moves axially toward the drive unit (toward the left in FIG. 3) and thus takes the pressure plate 34' along with it in the axial direction, so that this plate is pressed against the ring-shaped section of the clutch disk 12 carrying the friction linings, and the clutch disk is clamped axially between the pressure plate section 32 and the pressure plate 34'. When the diaphragm spring 60' is deflected in the manner indicated, it pivots around the support ring 242, so that the radially outer area of its ring-shaped section 62' moves axially toward the transmission (toward the right in FIG. 3); it thus carries the pressure plate 36' axially along with it via the force-transferring element 66 and the tension rods explained above in conjunction with FIG. 1 and presses the plate against the ring-shaped section of the second clutch disk 14 carrying the friction linings, so that this disk is clamped axially between the pressure plate 36' and the pressure plate section 32. In this type of clutch based on the NORMALLY OPEN principle, it is not essential for elastic forces to be exerted by the diaphragm springs 40', 60' to engage the clutch; in fact, it is advantageous for the diaphragm springs to be comparatively weak, so that the tongues or levers 50', 70' of the two diaphragm springs each operate as individual levers.

FIG. 4 shows a schematic diagram of a cross section through a dual clutch 10 corresponding structurally to the exemplary embodiment of FIG. 3. The dual clutch has the actuating module 200, which is in a support relationship with the housing 24 of the dual clutch 10 by way of the support bearing 230 in order to provide a closed circuit for the flow of axial forces. The actuating elements 222, 224, which could also be called bearing supports or actuating sleeves, are provided to cooperate with the support element 220, which could also be called a threaded sleeve or support sleeve, to form two moving screws, which can be actuated independently of each other, and each of which can be rotated independently with respect to the threaded sleeve 220. The actuating module is shown in conjunction with a dual clutch, preferably for a power shift transmission. As previously mentioned, the clutch or the clutches can be either of the NORMALLY OPEN design or of the NORMALLY CLOSED design. With regard to the actuating module, it is irrelevant whether the actuating forces are used to open or to close the assigned clutch arrangement. It is therefore also possible for one of the clutch arrangements to be of the NORMALLY OPEN type and for the other to be of the NORMALLY CLOSED type; the actuating module 200 could therefore be designed either with two engaging units, with two release units, or with a combination of an engaging unit and a release unit.

It should be pointed out that the closed circuit of axial forces in the installation module afforded by the support bearing 230 shown in FIG. 4 is not mandatory. The design of the combination shown in FIG. 4, however, is highly advantageous as a way of preventing the actuating forces from being absorbed axially by the crankshaft.

Figure 5:
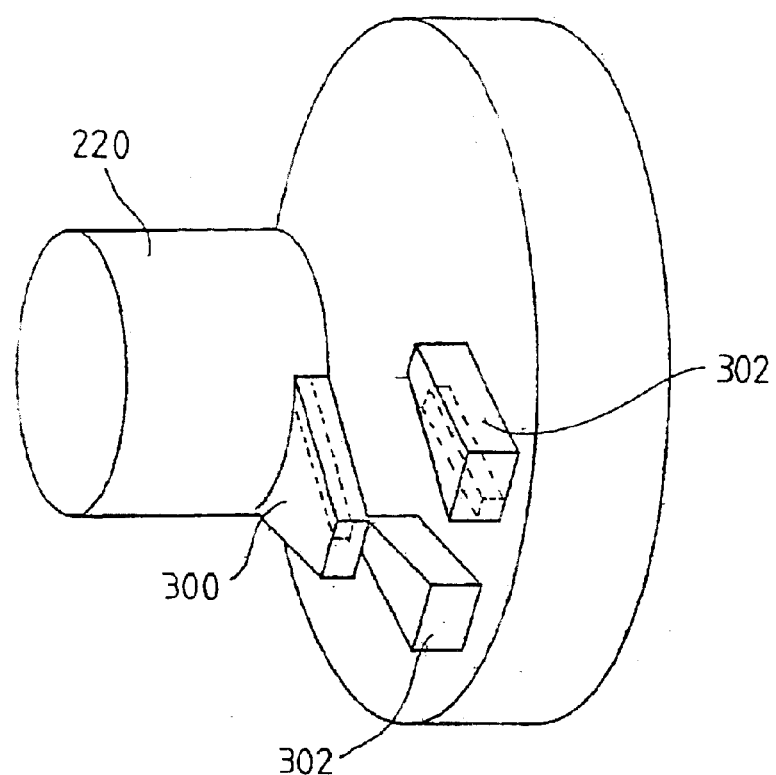
FIG. 5 shows an advantageous way in which an actuating module according to the invention can be attached to the transmission housing to secure the module against rotation, possibly in the manner of a quarter-turn fastener, and also to provide an axial securing function.

As explained above, the actuating module 200 consists essentially of three elementary parts, namely, the threaded sleeve 220 as the load-carrying element and the inner and the outer bearing supports 222, 224, each of which is designed as a sleeve. The threaded or support sleeve 220 is preferably supported radially on the engine-side transmission wall and secured there against rotation. FIG. 5 show a possible method for achieving this radial fixation, namely, by means of at least one radial projection (possibly a rib or tab) 300 on the circumference of the support sleeve 220, which is rests against at least one rib 302 or the like, which thus prevents the support sleeve 220 from rotating. As a rule, it will be advantageous to secure the support sleeve 220 against rotation in both rotational directions. According to FIG. 5, therefore, two ribs 302 are provided on the transmission housing, between which the projection 300 engages essentially without any rotational play.

The broken lines in FIG. 5 show a way in which locking formations can be provided on the support sleeve 220 and on the support base, i.e., possibly on the transmission housing. Here they are designed to form a quarter-turn fastener to secure the support sleeve 220 axially on the support base. This quarter-turn fastener can also be designed so that rotation in one direction is prevented by a type of latching engagement. Rotation in the other direction is preferably prevented in a positive, form-locking manner by the projection 300 and the rib 302 provided with the latching means. The other rib 302 without a quarter-turn fastener shown in broken line in FIG. 5 can then be omitted.

Another possibility for the purely radial fixation and rotational locking of the support sleeve 220 is shown in FIG.

6. The support sleeve is designed with radially projecting retaining tabs 304, which have openings 306 for retaining bolts 308 provided on the transmission housing or on the support base. Reference can be made in this connection to FIGS. 1 and 2. According to FIG. 2, the retaining bolts are designed as screws 308, which also secure the sleeve in the axial direction.

The support sleeve 220, as already explained, is designed with a single-flight or multi-flight internal thread, with a single-flight or multi-flight external thread, and with a bearing seat for the support bearing 230. The outer bearing support 222, which has an internal thread, is screwed onto the external thread; this outer bearing support preferably carries a bearing 226 capable of absorbing axial loads This bearing allows relative rotational movement between the engaging or release element 50' of the dual clutch 10 and the actuating module. A force application point 320 in the form of, for example, a spherical section on the outer bearing support 222 or more precisely on a lever section 342 of that support, makes it possible for an essentially tangential force to be applied to the circumference of the bearing support 222. Under the action of this tangential force, the bearing support 222 can execute a helical movement corresponding to the pitch of its internal thread and the external thread of the support sleeve 220 and thus actuate, by way of the element 50', the associated clutch arrangement. The radial distance between the force application point and the axis of rotation A determines the force/distance ratio of the actuating module with respect to the actuating sleeve (the bearing support) 222.

The inner actuating sleeve (the inner bearing support) 224 has a design similar to that of the outer actuating sleeve. The internal thread of the support sleeve 220 is screwed onto the external thread of inner actuating sleeve. These threads can have the same pitch as those of the threads selected for the outer actuating sleeve 222. In this case, it is preferable for the flights of the external and internal threads of the support sleeve 220 to be coordinated with each other in such a way that the "valleys" of the external thread coincide with the "hills" of the internal thread, as also shown in FIG. 4. In this way, the support sleeve can be designed with a comparatively thin wall.

The inner actuating sleeve 224 is also provided with a force application point 322, which is located on a lever section 340, for example, and has the form of a spherical section, via which an essentially tangential force can be applied, which causes the inner actuating sleeve 224 to move along a helical path. The bearing 228, which is also preferably designed to transfer axial force, transfers the axial displacement of the actuating sleeve 224 to the engaging or release element 40' of the associated clutch arrangement.

With respect to the force application points 320 and 322, it should be pointed out that, in addition to the use of a ball end-spherical section combination to couple the actuating sleeve in question with an associated translational actuator, it would also be possible to provide other types of couplings, preferably those which provide several degrees of freedom (rotating-tilting movements). In place of a ball end-spherical section combination, a so-called universal joint could also be considered in particular.

The actuators, which can also be called control elements, can, for example, be formed by hydraulic slave cylinders, where, for example, the piston rod of the slave cylinder can be designed with a ball end at the end pointing away from the cylinder to engage with the associated spherical section. Conversely, the ball end could also serve as the force application point, and the piston rod could be provided with a spherical section. The radial distances of the ball application points projected onto a plane orthogonal to the piston rods change as the actuating sleeves rotate. To compensate for these changes, the hydraulic slave cylinders (or the actuators in general) should be mounted with the freedom to pivot in or on the drive train.

With respect to the clutch-release or clutch-engaging bearings 226 and 228, it should also be pointed out that these bearings are preferably mounted on the associated actuating sleeve in such a way that a small amount of relative movement in the radial direction with respect to the sleeve is possible. This makes it possible for the bearings to center themselves automatically. In this connection, the spring plates 324, 326 shown in FIG. 4 represent only one of several suitable solutions.

With respect to the design of the internal and external threads, the following remarks should also be made. Preferred is a design which provides only one-sided support for the axial forces. One-sided engagement has the advantage of considerably reducing or even eliminating completely the danger of self-locking. The sawtooth design shown in the figures described above is preferred in particular. The flanks with the steep cross sections engage with each other.

It is especially advantageous for the thread flanks which engage with each other to extend in the radial direction, so that no radial forces are induced upon actuation.

The sleeves can be made of various materials. Especially advantageous, because low in cost, are sleeves (actuating sleeves and the support sleeve) which are made of plastic, where preferably self-lubricating or lubricant-modified plastics are used for the support sleeve and/or the actuating sleeves. An advantageous possibility is also to fabricate the actuating sleeves out of plastic and the stationary support sleeve out of aluminum or a plastic which is stronger than the material of the actuating sleeves. The converse arrangement of materials is also possible. Suitable pairings of materials for a support sleeve-actuating sleeve combination are in particular:

thermoset/aluminum, and thermoset/thermoplastic.

With respect to the lubricant-modified plastics which can be advantageously used, PTFE, molybdenum phosphite, and $MOS_2$ are especially suitable. Especially the lubricant-modified plastics polysulfone and polyphthalamide, each of which contains 15% PTFE (polytetrafluoroethylene), are also suitable.

To ensure especially low friction, it is also possible in principle to consider the wet lubrication of the internal and external thread combinations. For technical reasons, however, wet lubrication cannot be easily realized in dry-running dual clutches. The situation is different with wet-running clutches or wet-running dual clutches, especially wet-running multi-disk clutches. Here it is advisable to install the actuating module in the wet space to ensure forced lubrication.

Figure 7:
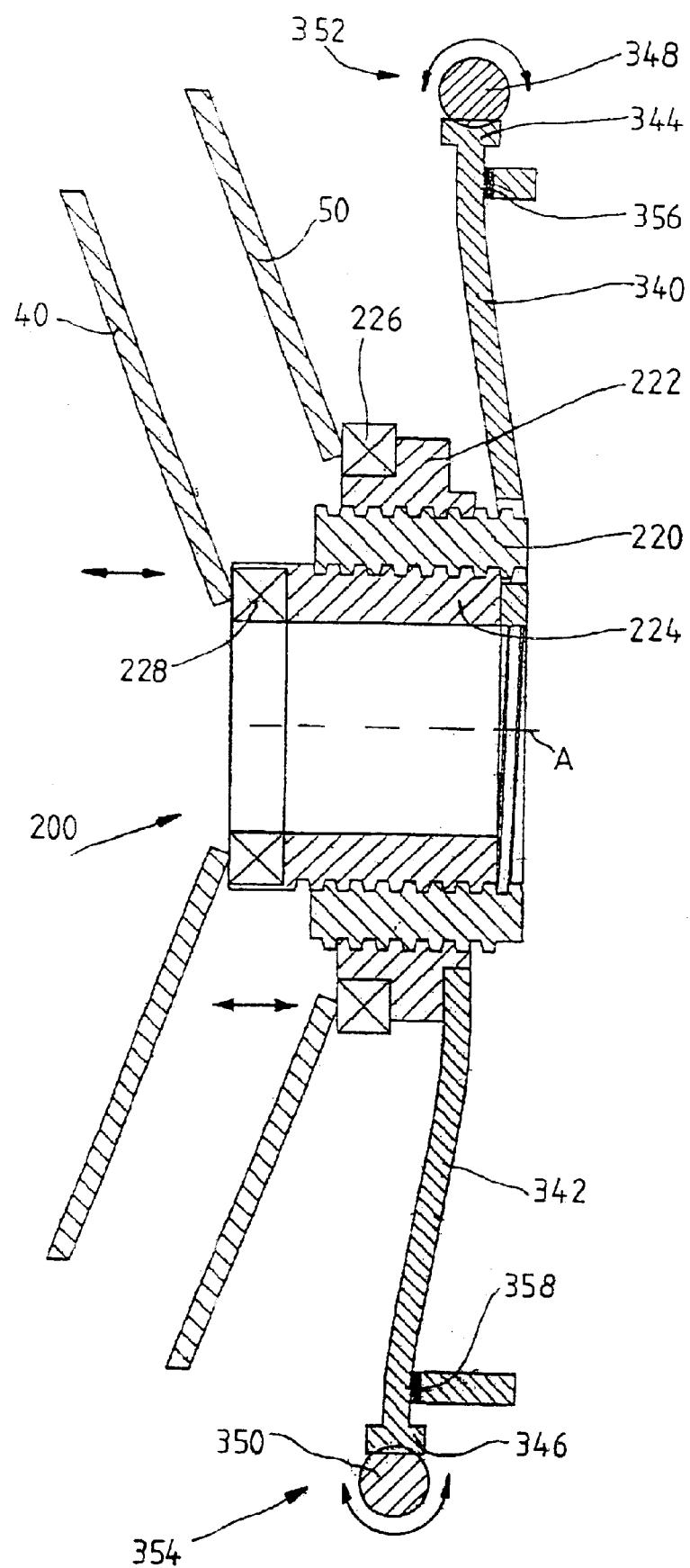
FIG. 7 shows a preferred way of establishing a drive connection between an actuating module according to the invention and an associated actuator arrangement by the use of worm gearing systems.

FIG. 7 shows a different way of producing and introducing a tangential force to cause the actuating sleeves 222, 224 described above to move along a helical path. Each of the two actuating sleeves is designed with a toothed wheel sector 340, 342, which has a toothed rim sector 344, 346 radially on the outside, with which a worm 348, 350 of a worm gearing system meshes. The worms 348, 350 are preferably driven by an electric motor, and drive torque can be applied to them in either rotational direction, as required. To compensate for the axial movement of the associated actuating sleeve 222, 224 at the mesh point between the worm 348, 350 and the associated toothed rim sector 344, 346, the toothed wheel sectors 340, 342, which can also be called actuating levers, can be designed as pretensioned leaf springs, the elastic force of which is directed against associated friction points 356, 358. At the same time, these friction points prevents the actuating sleeves from being automatically reset or restored by the action of the associated clutch-release spring arrangement or by the action of the forces which oppose the pressing force acting on the associated clutch arrangement (the example of a NORMALLY OPEN clutch arrangement being assumed here). The clutch arrangement in question can then kept closed without the expenditure of any energy, and in particular the state of actuation present at the moment in question is preserved, even when the electric motors assigned to the worms 348, 350 are dead. The described "self-locking" function could also be provided in the associated worm gearing system itself, so that it is possible in this case to omit the friction points 356, 358. It is also advantageous to provide activatable and deactivatable friction brakes provided with friction points, for example, which can be shifted in the axial direction by an electromagnetic control element. The friction brakes should brake when the motor assigned to the worm gearing system is not activated or is dead. For this purpose, the electromagnetic control element possibly being used can be designed to activate the friction brake when the power fails.

Figure 8:
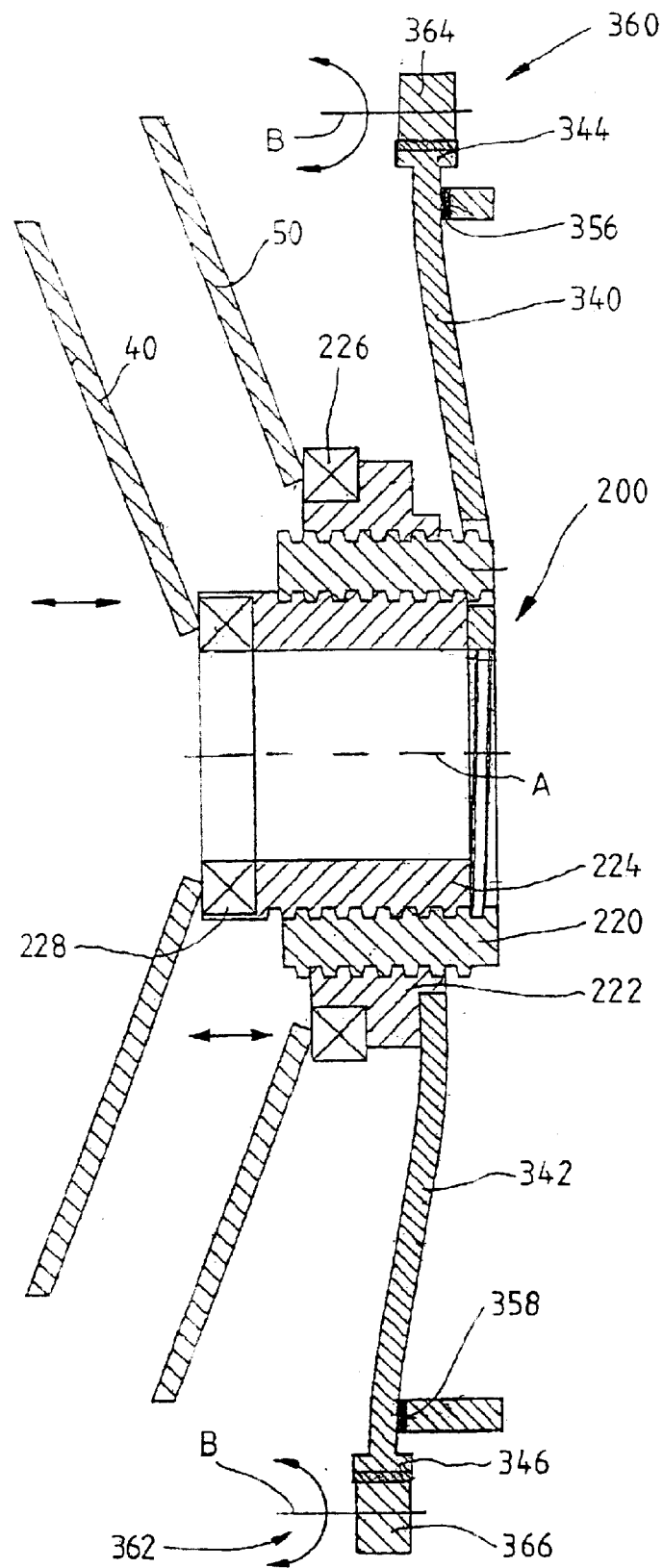
FIG. 8 shows another advantageous way in which a drive connection can be established between an actuating module according to the invention and an assigned actuator arrangement by the use of toothed wheel gearing systems.

FIG. 8 shows a design variant in which the actuating sleeves 222 and 224 of the actuating module 200 can be shifted rotationally by the intermediate action of an associated toothed wheel gearing system 360, 362; because of the threads, however, this rotation is converted to a translation. Each toothed wheel gearing system has a pinion 364, 366, which meshes with an associated toothed rim segment 344, 346 of the toothed wheel sector 340, 342. The drive pinions 364, 366 are preferably driven by electric motors. The rotational movements imparted to the sleeves 322, 324 by the toothed wheel sectors 340, 342 generate the described helical movement of the associated actuating sleeves relative to the support sleeve 220.

Also in the case of the exemplary embodiment of FIG. 8, the toothed wheel sectors 340 and 342, which can also be called actuating levers, can be designed as leaf springs to compensate for the axial movement of the actuating sleeves 322 and 324. The leaf springs can be connected advantageously by means of rivets, for example, to the actuating sleeves, which are preferably made of plastic. As previously explained, the support sleeve 220 can also be made of plastic or some other easily processed material such as aluminum so that the actuating module 200 can be produced at the lowest possible cost.

It should be pointed out that, in the design variants described so far, the ends of the actuating levers, including the actuating levers with the force application points 320 and 322, could also be extended through the transmission shroud and could then be actuated from the outside to produce the helical movement. With respect to the pinion-toothed wheel combination according to FIG. 8, it should be pointed out that it would be possible for teeth to be helical as well as of the spur type.

As previously explained, the design of the thread realized in FIGS. 1–4 as a sawtooth thread is especially preferred, because such a design makes it especially easy to allow the axial forces to act on only one side. Other thread designs are also possible, however, such as the round thread according to FIG. 9a or the trapezoidal thread according to FIG. 9b.

Figure 10:
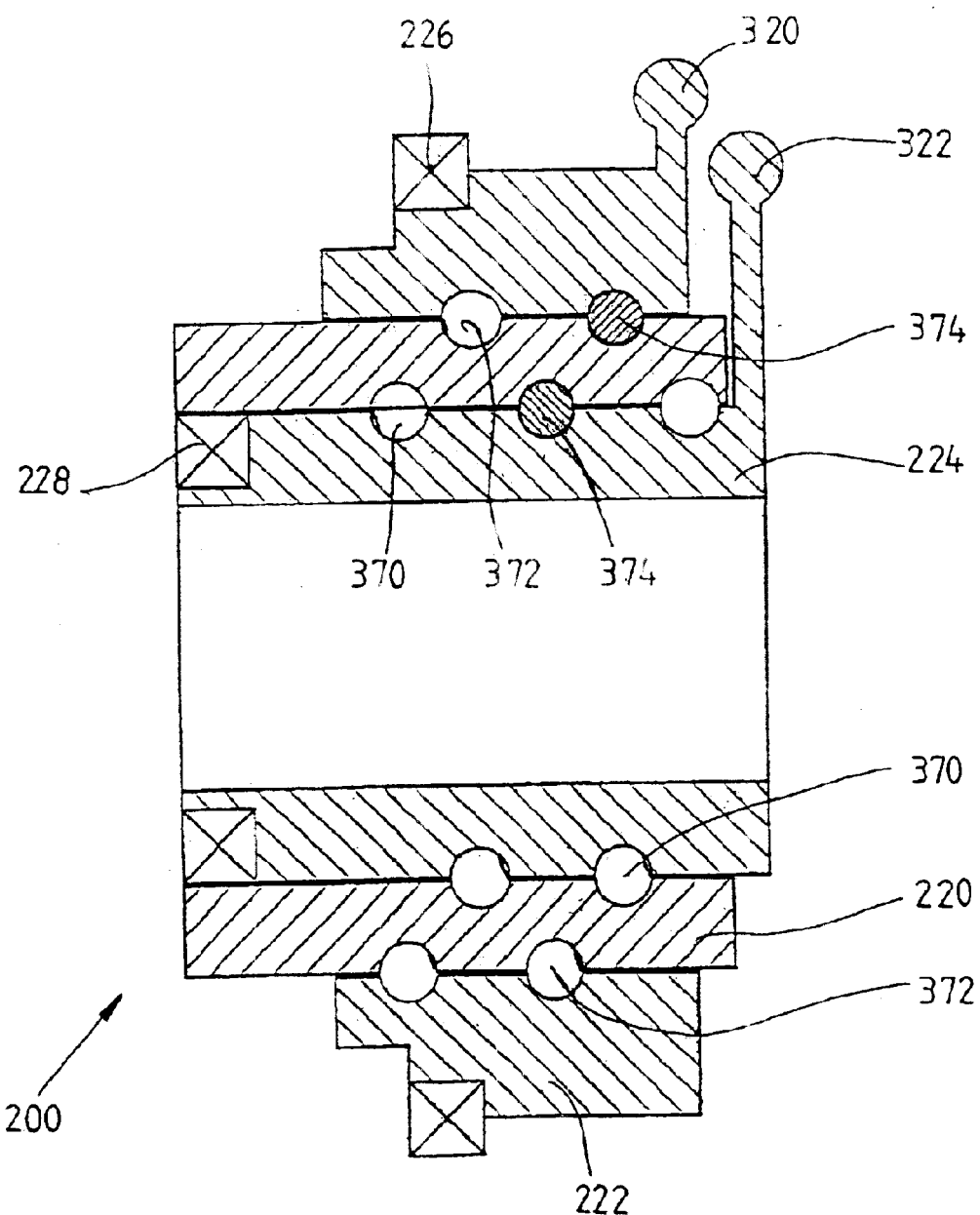
FIG. 10 shows a schematic diagram of a preferred embodiment of the actuating module according to the invention with ball screws, which act between the support sleeve and the actuating sleeves.

An actuating module 200 with especially low friction because the friction between the sleeves is of the rolling type instead of sliding type is illustrated schematically by the exemplary embodiment in FIG. 10. The support sleeve 220 and the actuating sleeves 222, 224 are designed with raceways 370 and 372 for roller balls 374. If a continuous chain of balls is provided, one of the sleeves of the each pair, i.e., the pair consisting of the support sleeve and the outer actuating sleeve and the pair consisting of the support sleeve and the inner actuating sleeve, can be designed with a ball return, known in and of itself.

Because of the pure rolling friction, the efficiency upon actuation in the case of an actuating module of the type illustrated in FIG. 10 is much greater than in the case of the exemplary embodiments with sliding friction between the sleeves described previously. Another advantage of this variant is the possibility of providing a non-uniform pitch on the threaded spindles, that is, a pitch which changes in the axial direction. This makes it easy to adapt the actuating force to the change in the engaging or releasing force of the clutch arrangement in question. Threaded spindles with changing pitch can be designed, for example, in such a way that one of the two sleeves of the pair of sleeves in question is designed with at least one circumferential ring-shaped groove for at least one ball, whereas the other has at least one raceway with changing pitch for the ball or balls.

Figure 11:
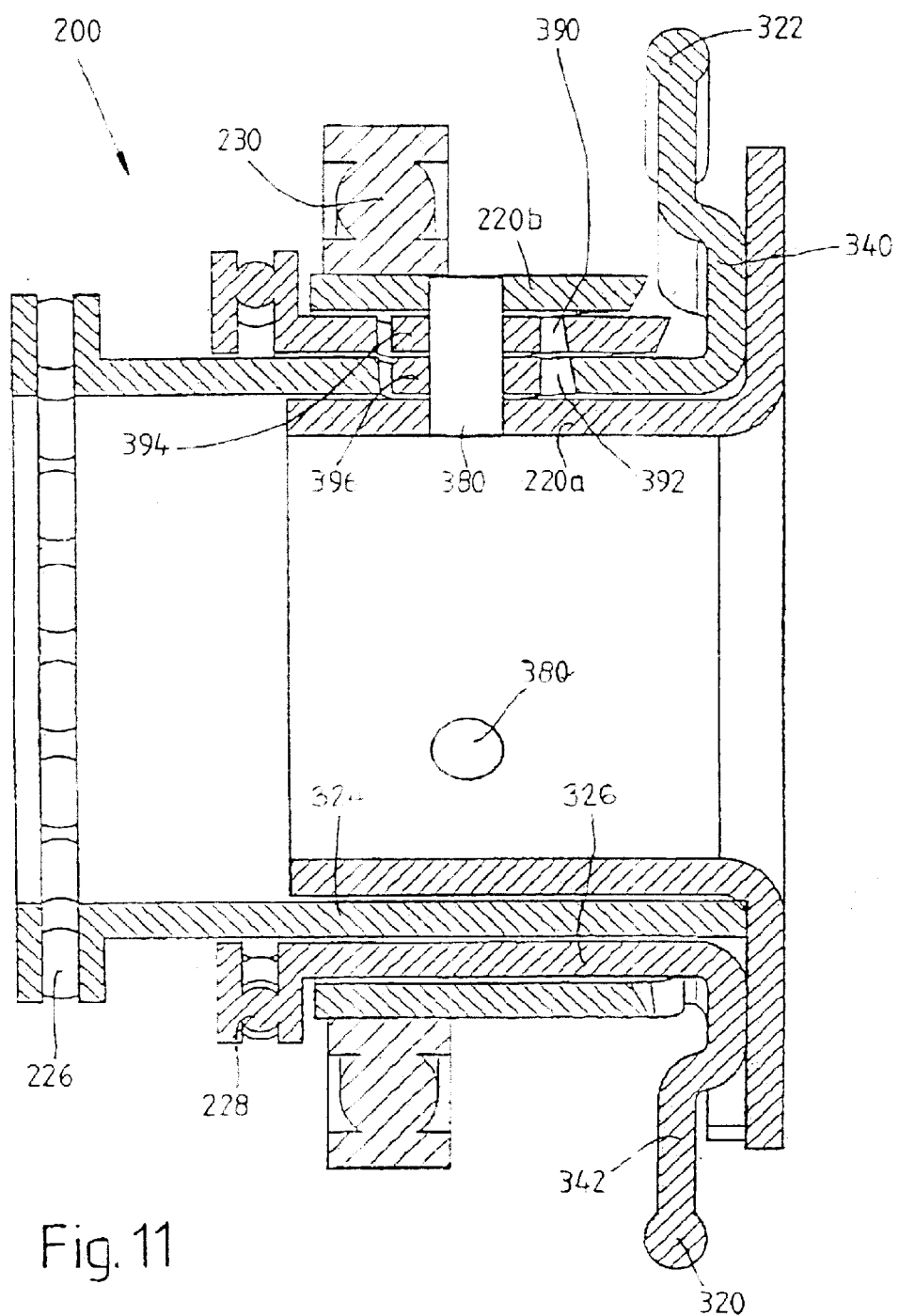
FIG. 11 shows a sectional view of an advantageous exemplary embodiment of an actuating module according to the invention, which is composed of sleeves made of metal sheet or plate, two of these being actuating sleeves, which are connected by a link-link follower arrangement to two support sleeves radially surrounding them to convert rotational movements of the actuating sleeves to axial movements of these sleeves.

An especially low-cost actuating module 200 which can be made from metal sheet or plate is illustrated in FIG. 11. This actuating module has an inner support sleeve 220a and an outer support sleeve 220b, which together serve as the support element; these sleeves are connected to each other by several, preferably by at least three, radially oriented pins 380 and are attached nonrotatably to the wall of the transmission unit, for example. The outer support sleeve 220b carries the central support bearing 230. Between the two support sleeves, a radially outer actuating sleeve 222 and a radially inner actuating sleeve 224 are provided, each of which carries a preferably axial force-transferring, clutch-engaging or clutch-releasing bearing 226, 228. The support sleeves and the actuating sleeves are manufactured preferably out of metal sheet or plate. Each of the actuating sleeves has at least one, preferably at least three, openings or links 390, 392, that is, precisely one link or opening 390, 392 for each pin 380. The pins 380 pass through these links. To provide the required guidance, each link defines a guide curve, which engages with the associated pins by way of plain bearings or possibly roller bearings 394, 396. The plain bearings 394, 396 can be designed as ring-shaped or sleeve-shaped parts which can rotate relative to the pins and which are matched with respect to their dimensions and positions to the links in such a way that they can roll along the possibly nonlinear contour of the curved link in question. The guide curves or curved contours of the links rise axially in the circumferential direction in either a linear or preferably a nonlinear manner (see the exemplary embodiment of FIG. 12), so that a rotational movement of the actuating sleeve in question is converted to an axial movement of this actuating sleeve by the intermediate action of the associated pin-link combination (one could also speak of a link follower-link combination). As a result of the application of tangential force to the actuating lever 340, 342 at approximately the force application point 320, 322, the actuating sleeve in question is thus moved both radially and axially similar to a screw, as previously described.

In place of the plain bearings 394, 396, it would also be possible to use antifriction bearings such as grooved ball bearings. Especially in cases where the axial forces to be transferred are relatively weak, it can be possible in certain situations to do without any bearings at all on the pins 380. The pins will then slide directly along the curved contours.

Figure 6:
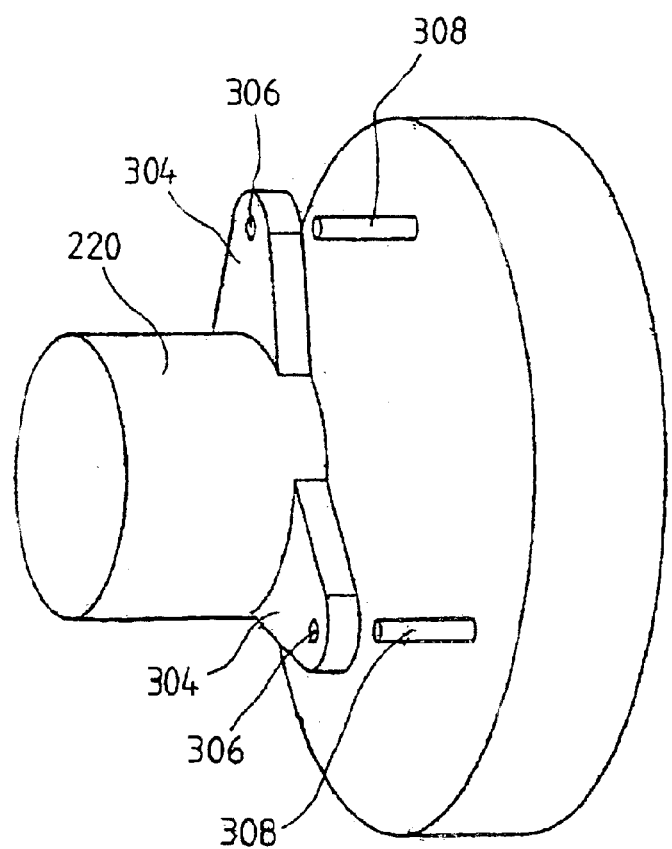
FIG. 6 shows another advantageous way in which an actuating module according to the invention can be attached to a transmission housing to secure the module against rotation.

There are in principle many different conceivable ways in which the actuating module 200 according to FIGS. 10 and 11 can be prevented from rotating and possibly also prevented from moving in the axial direction. The solutions according to FIGS. 5 and 6 are especially suitable for this purpose, but the actuation variants described in conjunction with FIGS. 7 and 8 can also be used for these actuating modules.

Figure 12:
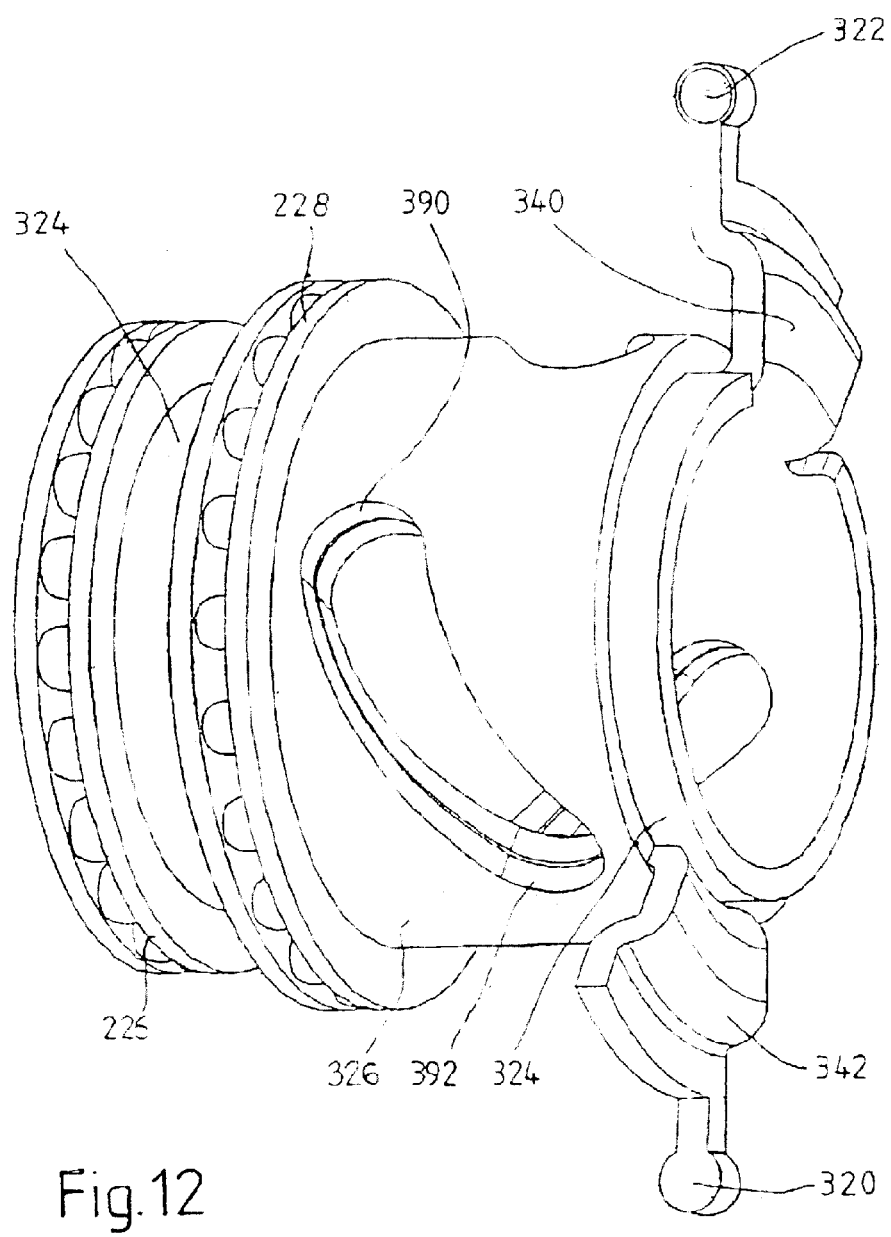
FIG. 12 shows an advantageous design possibility for actuating sleeves with links, which define circumferential guide curves which rise axially in a nonlinear manner.

The combination of the two actuating sleeves according to FIGS. 11 is shown in perspective in FIG. 12. The links 390, 392 of the associated actuating sleeves 324, 326 can be seen, where three links in the form of openings are provided in each case. The links define guide curves with a nonlinear rise, which determines the conversion of the rotational movement in question into the associated axial movement.

Figure 13:
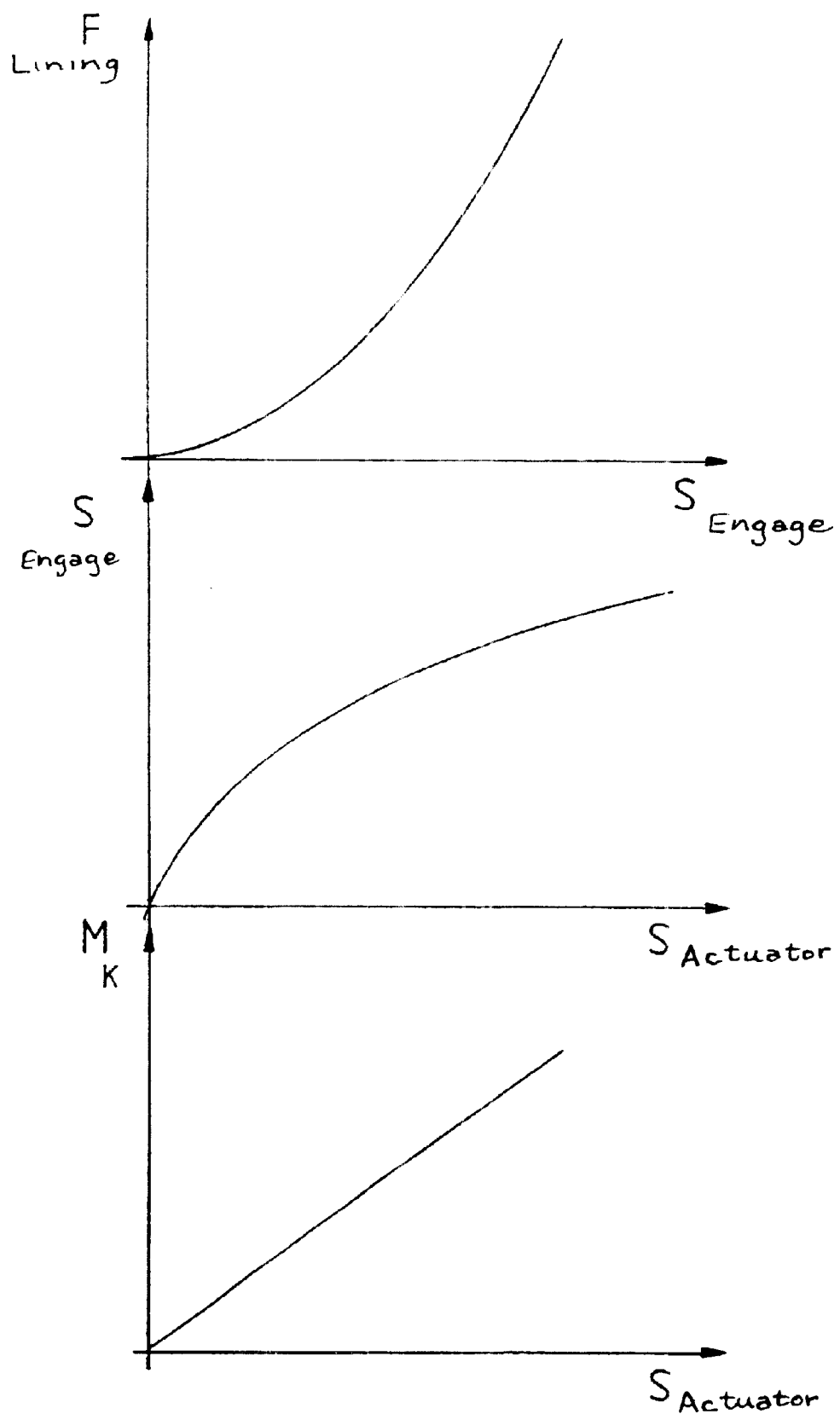
FIG. 13 shows three diagrams, which illustrate how the relationship between transfertable clutch torque and the actuating travel of an actuator can be linearized by establishing a nonlinear relationship between actuator travel and clutch-engagement distance.

These types of guide curve with pitches which are not linear over the entire rotational control distance are especially advantageous in terms of improving the modulation capacity. The ultimate goal here is to improve the modulation capacity by controlling the distance which the clutch must travel to become engaged. In the case of a clutch of the NORMALLY OPEN type, the spring characteristic of the lining (see the diagram at the top of FIG. 13) provides a relatively pronounced nonlinearity, because the elastic support of the lining must be compressed during the clutch-engaging process with a certain, clearly progressive force-distance characteristic before it can transfer a torque essentially proportional to this force: clutch torque $M_K$~clutch-engaging distance$^m$, where m>1.

To compensate for this nonlinearity, the actuating distance can have the opposite type of nonlinearity (see the diagram in the middle of FIG. 13), so that an approximate relationship such as the following, for example, is achieved with a degressive slope of the actuator distance:

clutch-engaging distance~actuator distanced, where p<1.

If the nonlinearities are appropriately paired (in the case of the example: m=p), it is possible in the end effect to arrive at an essentially linear relationship between the actuator distance and the clutch torque (see the diagram at the bottom of FIG. 13) and therefore to arrive approximately at the relationship:

clutch torque~actuator distance.

As a result, the control performance of automatically controlled clutch actuation (constant resolution) is significantly improved.

It should be remarked that, when an actuating system which can actuate the actuating elements in both rotational directions is used, that is, when an actuating system is used which can produce and transfer both pushing and pulling forces (such as an actuator driven by an electric motor or by a double-sided hydraulic slave cylinder), it is even possible for the pitch at the end of the clutch-engaging distance to become equal to zero or even slightly negative at the end of the engaging distance. As a result, the clutch arrangement in question can be kept closed automatically in the engaged state without the application of any external actuating forces or auxiliary forms of energy, which is highly advantageous with respect to energy consumption. Corresponding advantages are also derived in the case of a clutch arrangement of the NORMALLY CLOSED type.

Figure 14:
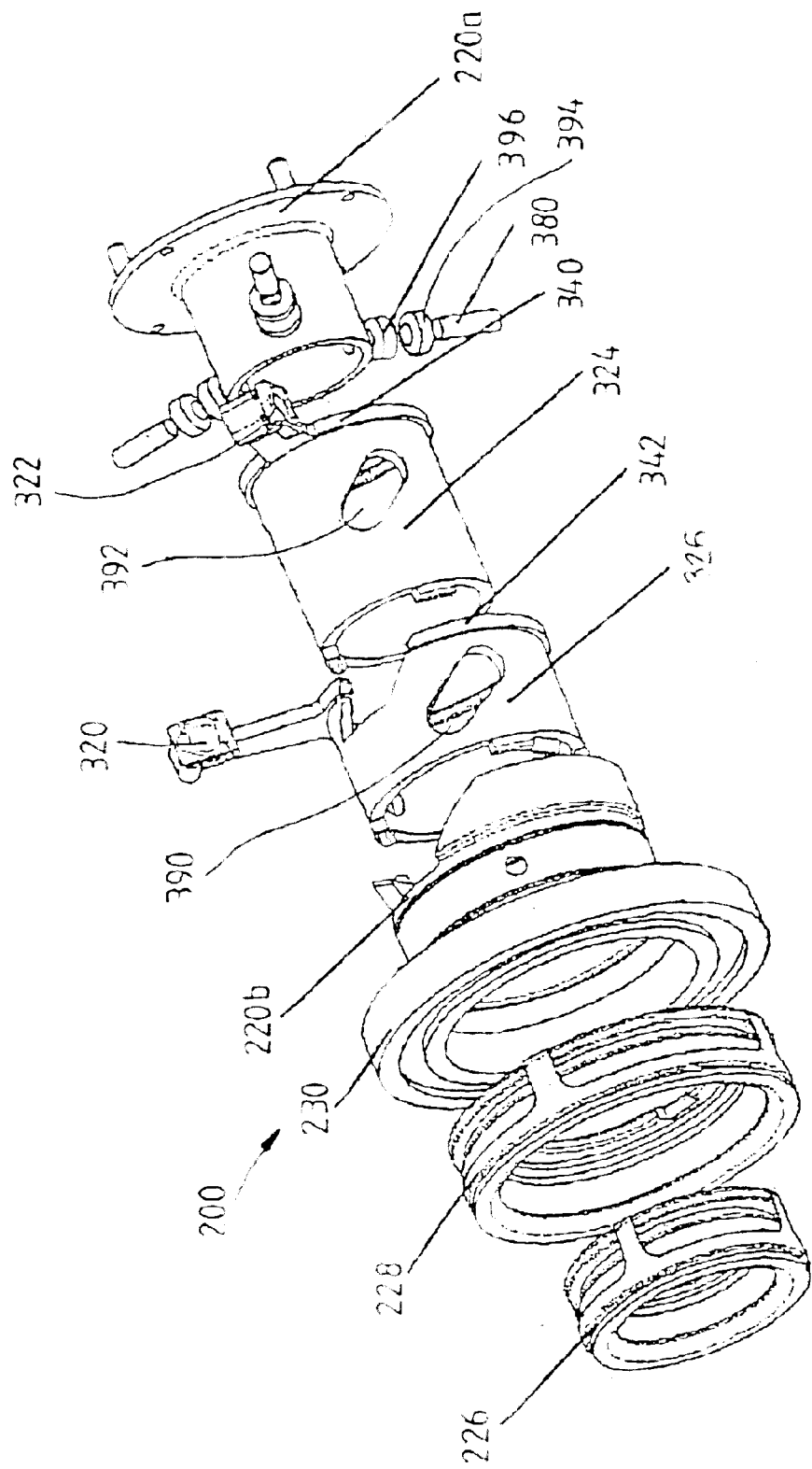
FIG. 14 shows an exploded view of an actuating module with the basic design according to FIGS. 11 and 12.

FIG. 14 shows an exploded diagram of an embodiment of an actuating module 200 with the same basic design as that shown in FIGS. 11 and 12. In contrast to FIG. 12, the actuating sleeves 322, 324 have links 390, 392, which define guide curves with a linear rise. It is also possible to recognize the inner clutch-release bearing 226; the outer clutch-release bearing 228; the central support bearing 230; the outer support sleeve 220b, which is stationary during operation; the outer sliding or actuating sleeve 322 with the link 390; the outer deflection lever 342 and the spherical section 320; the inner sliding or actuating sleeve 324 with the link 392; the inner deflection lever 340 and the spherical section 322; the spindles or bearing pins 380; the plain bearing rings or bushings 394 and 395 (made of PE/PTFE, for example,); and the inner support sleeve 220a, which remains stationary during operation.

Figure 15:
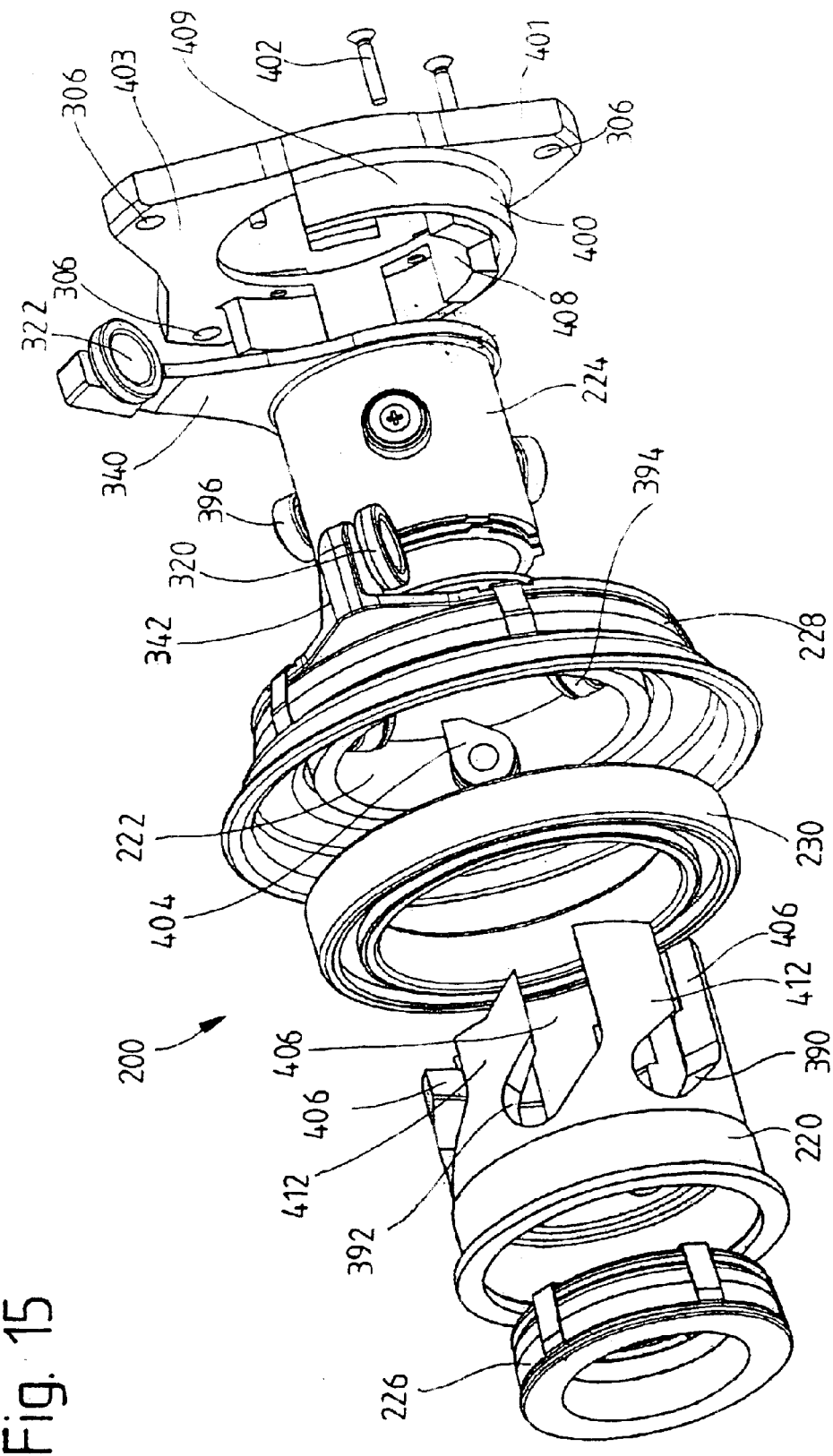
FIG. 15 shows an exploded view of an additional actuating module according to the invention.

FIG. 15 shows another embodiment of an actuating module 200 according to the invention, which is of a design similar to that of the examples shown in FIGS. 11, 12, and 14 with link-link follower arrangements for converting rotational movements into axial movements. The module 200, which can also be called an actuating unit, has a central support sleeve 220, which can be supported on the transmission side by an associated flange part 400, as will be explained in greater detail below. The support sleeve 220 is also assigned a support bearing 230, by means of which a support relationship with a clutch housing or the like can be produced in order, as explained above, to provide an essentially closed circuit for the flow of axial forces within the overall module comprising the dual clutch and the actuating module 200.

An inner actuating sleeve 224 and an outer actuating sleeve 222 are provided as actuating elements, between which, in the assembled state, the support sleeve 220 is held. The inner actuating sleeve 224 is assigned the inner release bearing 226, and the outer actuating sleeve 222 is assigned the outer release bearing 228. It is also possible to see the actuating or deflecting levers 340, 342 projecting radially from the actuating sleeves together with their spherical sections 322, 320, on which, for example, a hydraulic cylinder-piston device can act. The actuating module of FIG. 15 is preferably provided for the actuation of a dual clutch of the NORMALLY OPEN type.

Figure 17:
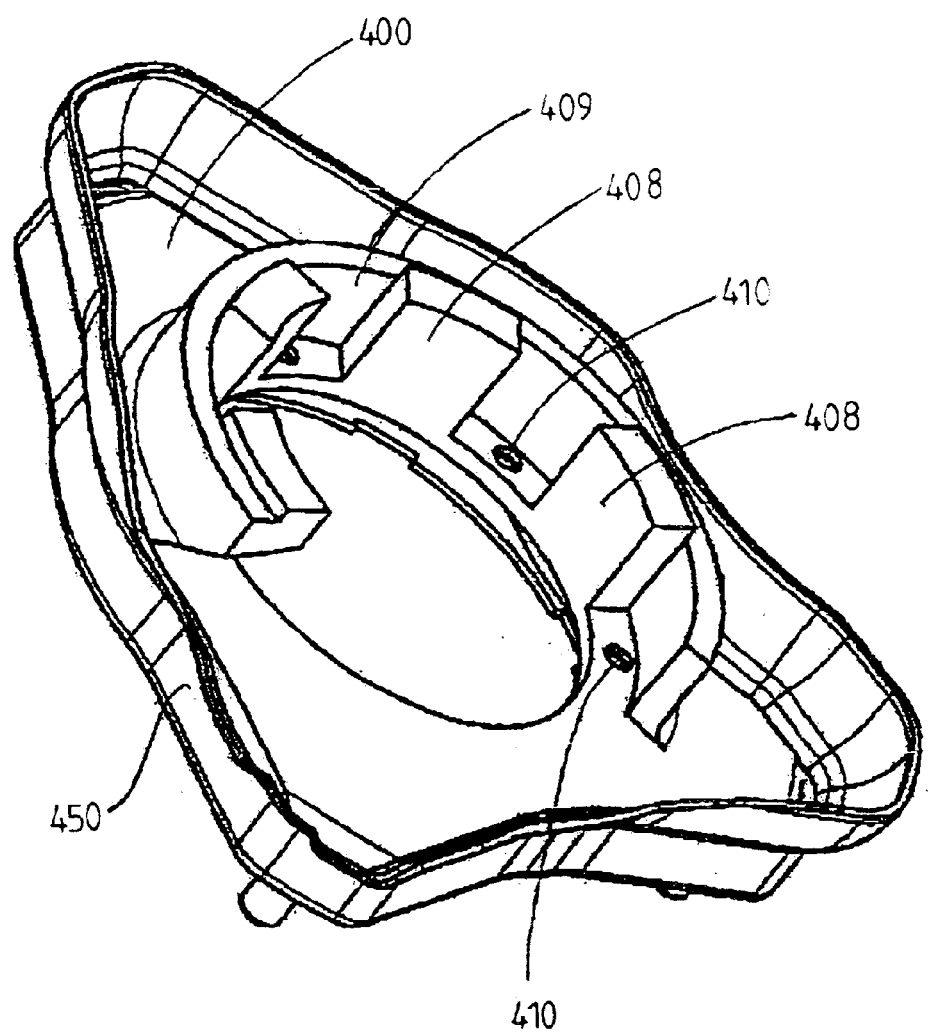
FIG. 17 shows a plug-in section, designed as a flange part, of the actuating module of FIGS. 15–16, after it has been plugged into a shell-like or basket-like mounting part, which, after installation on the transmission housing, serves as the mounting receptacle.
Figure 18:
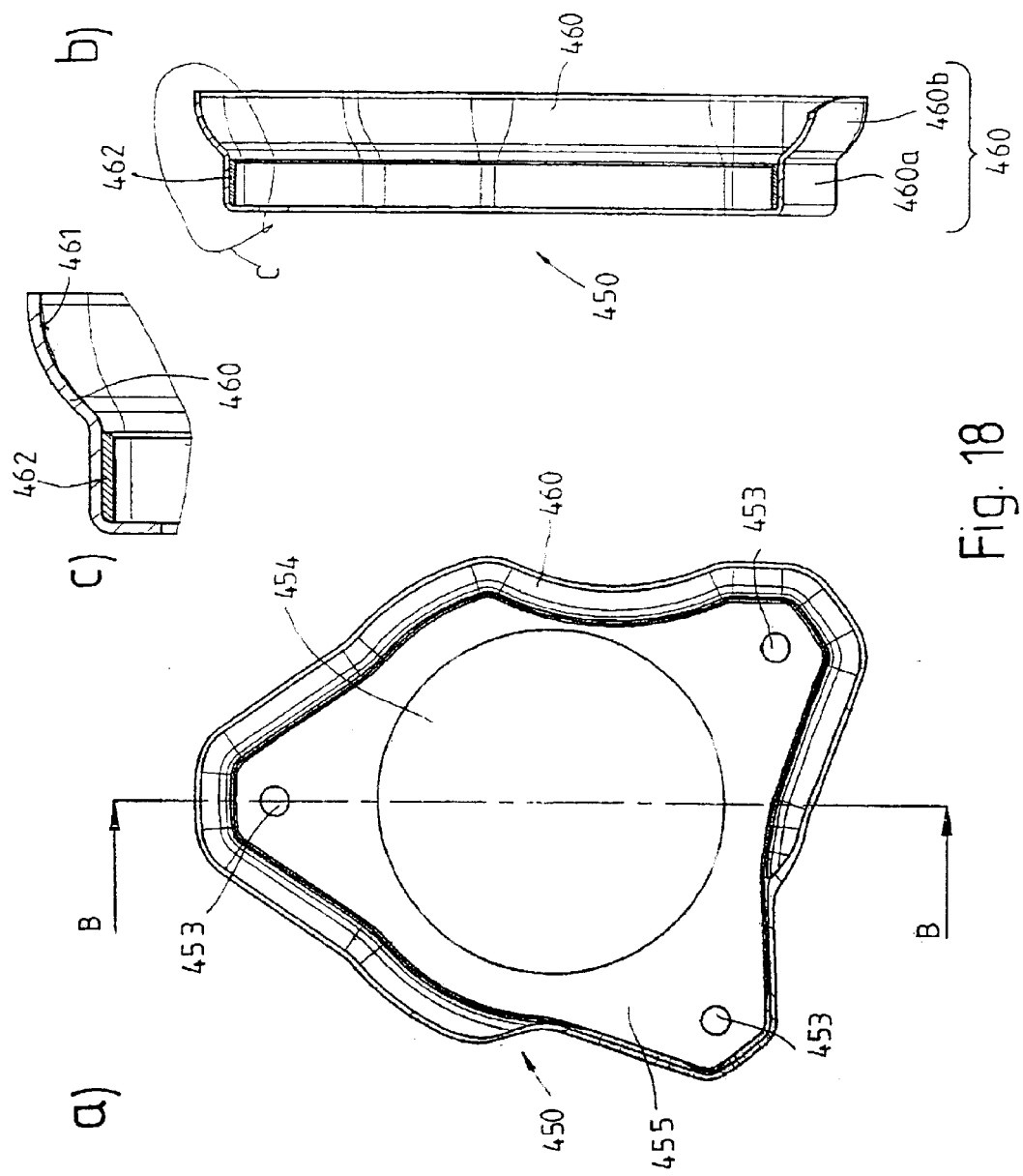
Figure 19:
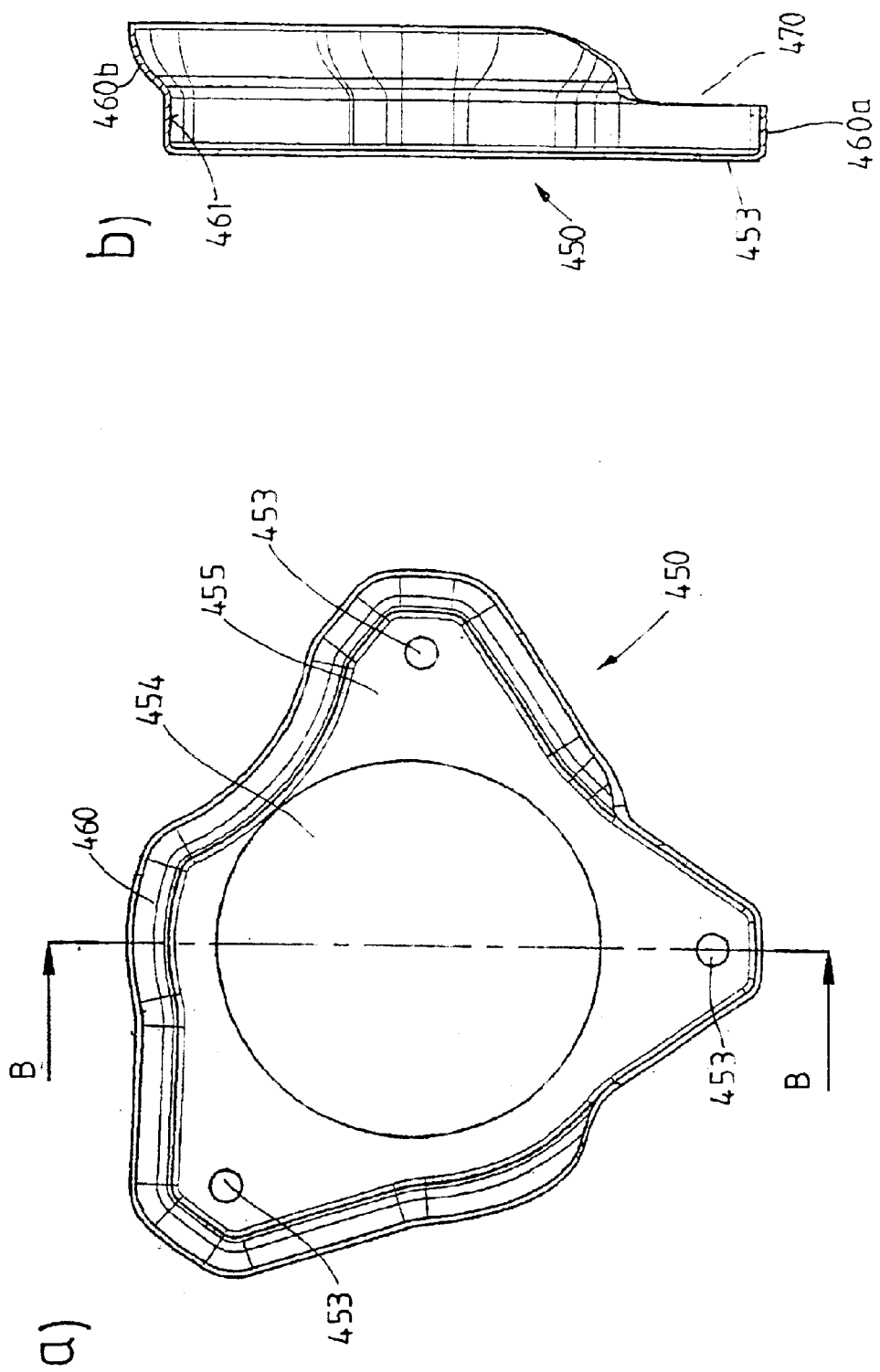

The central support sleeve 220 and the flange part 400, which is shown in a different perspective in FIG. 17, can be plugged into each other and screwed together with screws 402 to form an integral unit and can then be fittingly referred to in common as a support element or support sleeve with flange. In contrast to the examples of FIGS. 11, 12, and 14, the support sleeve 220 has links 390, 392, which define guide curves, on which curve followers in the form of rollers 396, 394 act, which are firmly attached axially to the actuating sleeves 224, 222 and each of which is mounted on a spindle by way of a grooved ball bearing. In correspondence with the design of the actuating module 200, the rollers 396 of the radially inner actuating sleeve 224 are attached to the outside circumference of the sleeve, whereas the rollers 394 of the radially outer actuating sleeve 222 are attached to the inside circumference of sleeve. To secure the rollers 394 on their respective spindles, the actuating sleeve 222 can be provided with fastening elements 404 in the shape of a "U", for example, which extend radially from the inside toward the outside to enclose the rollers.

Figures 16A, 16B:
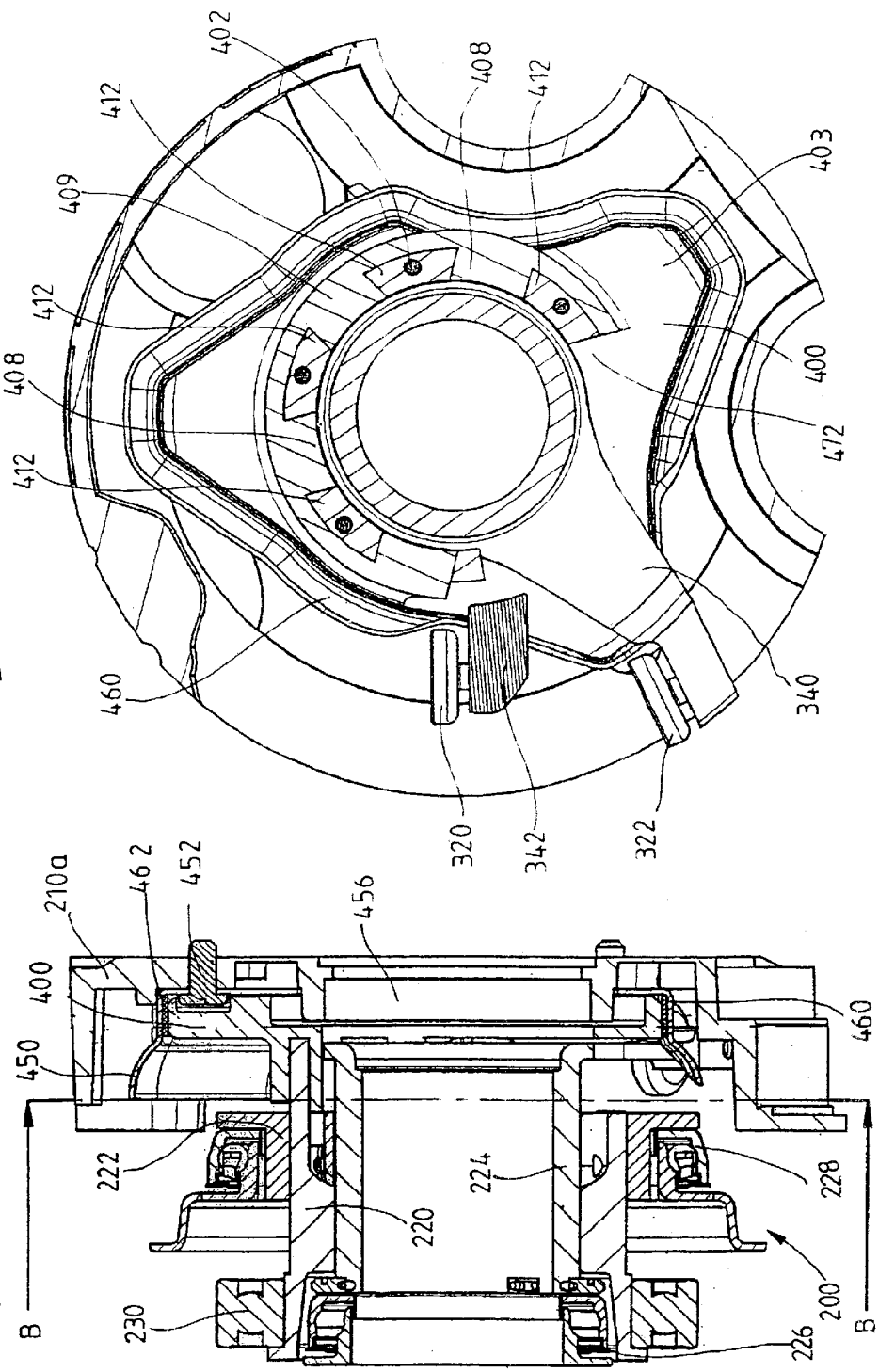

The links 390, 392 in the central support sleeve 220 are extended in the axial direction to form insertion slots 406, which are open toward the transmission, so that, when the actuating module is plugged in, the rollers 394, 396, which are premounted on their associated actuating sleeves 222, 224, can be easily introduced into their assigned links 390, 392. Then the support sleeve 220 can be fitted to the flange part 400 and screwed to it. When the support sleeve 220 and the flange part 400 are assembled, axially projecting sections 408 of the flange part enter into some of the insertion slots 406, as a result of which some of the links 390 and some of the links 392 are closed off, so that the actuating module 200 is to this extent held together. Through-holes for the connecting screws 402 are designated 410 in FIG. 17. The screws 402 are screwed into screw holes with internal threads in sections 412 of the support sleeve 220 located between the insertion slots 406, as is especially easy to see in the sectional view of FIG. 16b.

The flange part 400 can be designed with openings 306 in the radially projecting flange or tab sections 403, which openings can accept retaining bolts extending from the transmission housing or support base in order to provide radial fixation and to prevent the support sleeve 220 from rotating in a manner similar to that of FIG. 6. A different type of radial fixation and nonrotatable attachment of the support sleeve and thus of the entire actuating module 200 is preferred, however, which is explained below on the basis of FIGS. 16–20. FIGS. 16–20 show to this extent an exemplary embodiment of the invention according to a different aspect of the invention, which is also of interest independently of the type of actuating module and independently of the way in which it functions. This type of radial fixation and nonrotatable attachment can be also be considered, for example, for actuating modules or actuating units based on one or more hydraulic actuating cylinders, especially ring cylinders. Without limiting the general applicability of the idea, the invention will nevertheless be explained in greater detail on the basis of the actuating module 200 of FIG. 15.

Figure 20:
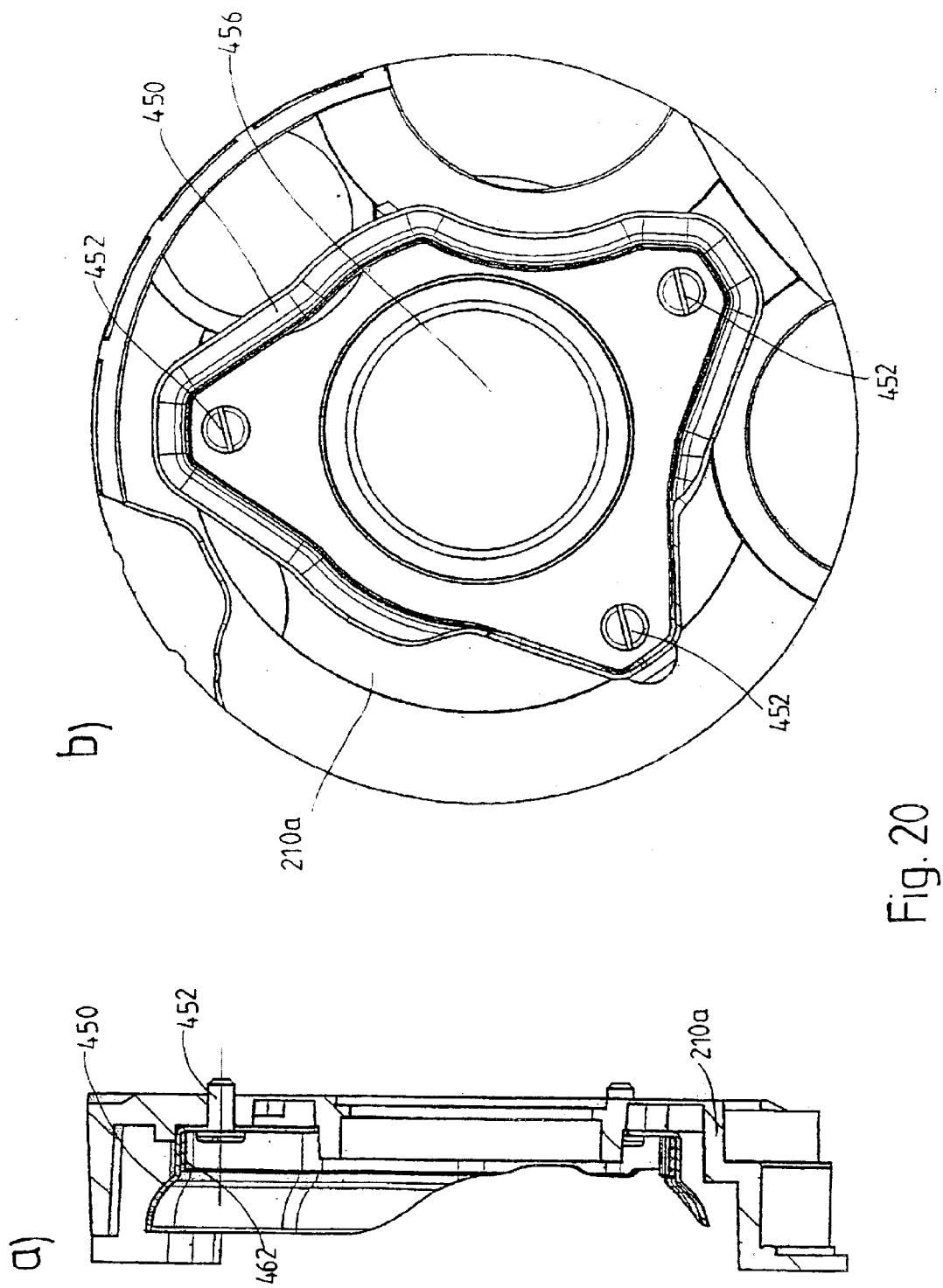
FIG. 20a is a sectional view of the mounting part of FIG. 18 together with its elastomeric inlay in the installed state on the transmission housing.
FIG. 20b is an axial view of the mounting part of FIG. 18 together with its elastomeric inlay.

An essential aspect of the invention is to provide a transmission-side mount, into which the actuating module can be plugged; in the case of the exemplary embodiment according to FIG. 15, the axial end of the flange part 400 is designed as a flange or is provided with flange sections. The openings 306 according to FIG. 15 can be omitted in this case. As the transmission-side mount, it is possible, for example, to provide an integral or one-piece receptacle, which is machined into the transmission housing, or a mounting part which is attached to the transmission and which is provided with a corresponding receptacle. FIGS. 16–20 show this type of receptacle-forming mount part 450, which is designed as a shell or basket, and which, according to FIGS. 16 and 20, is screwed to a section 210a of the transmission housing by screws 452 passing through holes 453, so that a through-opening 454 in a bottom section 455 of the mounting part 450 for the transmission input shafts essentially lines up with a corresponding through-opening 456 in the transmission housing for the transmission input shafts.

The mounting part 450 can advisably be made of metal sheet or plate; it could be deep-drawn out of steel sheet or plate, for example. Another possibility is for the mounting part to consist of injection-molded plastic.

The flange part 400, which, like the support sleeve 220 and the actuating sleeves 122, 124, can be made of conventional materials such as steel, plastic, and aluminum (possibly as a die-cast part), and the mounting part 450 are mated to each other in such a way that the flange part or its axial end section can be inserted essentially without play or preferably with a certain defined amount of play into the receptacle formed by the mounting part, which is surrounded on all sides by a wall 460 of the mounting part 450. It is advisable for the components to be mated to each other so that an elastomeric inlay 462, possibly in the form of an elastomeric ring, can be inserted radially between the end section of the flange part and the wall 460 to prevent direct contact between an outside surface 401 of the flange part 400 and the inside surface 461 of the wall 460, while still allowing radial movements of the flange part 400 and thus of the module 200 to compensate, for example, for any axial offset which may be present between the power takeoff shaft of the drive unit (especially the driveshaft of the drive engine) and the transmission input shafts. It is also quite possible, however, simply to provide sufficient radial play between the flange part 400 and the wall 460 of the mounting part 450 and to omit the elastomeric inlay or the like, but this could lead to the production of noise during operation. It is therefore preferable to provide the elastomeric inlay 462, which is especially easy to see in FIG. 18.

To facilitate the installation and positioning of the actuating module 200 on the transmission, the wall 460 of the mounting part 450 is designed with an essentially axial section 460a and an adjoining, radially outward-expanding section 460b. The axially oriented section 460a defines with its inside surface the nominal position or nominal positioning area for the flange part 400. The section 460b serves only as an assembly aid, in that its inside surface serves as a threading-in surface or insertion bevel for the actuating module—or more precisely for the flange part of this actuating module—to be installed or positioned. When the flange part 400 is to be inserted into the receptacle of the mounting part 450 defined by the wall section 460a, therefore, it is not necessary to bring the module up to the transmission with precise axial alignment or in a precisely maintained radial and rotational position relative to the transmission.

The following point should also be made. To give the lever 340 sufficient room for a rotational or pivoting movement during a clutch-actuating operation, the wall section 460b does not extend completely around the receptacle, as is especially easy to see in FIG. 19b. The opening left free for the lever is designated 470 in FIG. 19b. For the same reason, the flange part 400 is not provided with a ring of sections 408 extending all the way around or with a complete ring-shaped section 409 adjoining these sections radially on the outside; on the contrary, it is designed with only a partial ring of sections and a partial ring, which leave an opening 472 for the lever 340. So that, in spite of this, a connection can be established between the flange part 400 and the support sleeve 220 which is still able to absorb high radial forces, the sections 412 of the support part 120 and the sections 408 of the flange part 400 engage with each other in the manner of a dovetail joint (see FIG. 16).

The mounting solution described above on the basis of FIGS. 16–18 for the mounting of the actuating module on the transmission as well as the previously explained solution according to FIG. 6 offer the advantage that the actuating module remains free to move axially, if desired. Nevertheless, the reactive torques which result from the actuation of the levers are also absorbed reliably. Because of the design of the flange part 400 and of the mounting part 450 shown in the figures, these reactive torques are distributed all the way around and are therefore absorbed over a large area.

It should be pointed out that the actuating module could also be fixed in place axially. It is advantageous, however, if the actuating module or the overall module comprising the clutch and the module is able to copy the axial movements which could result from the axial play of the crankshaft, for example, thus preventing axial loads from acting on the crankshaft.

The mounting part reliably centers the flange part 400 and thus the entire actuating module, as previously explained, preferably by way of the entire outside contour 401 of the flange section of the flange part 400. To avoid force-fits or stresses resulting from, for example, an axial offset between the engine and the transmission and thus to avoid an increase in the natural wobble frequency of the overall module which might result, the flange part 400 is preferably held in the receptacle with a certain amount of radial play and possibly held in a centered position under elastic pretension by an elastomeric inlay or the like. An elastomeric inlay, designed for example, as a shaped piece of elastomeric material, can reliably prevent undesirable noise from being produced by direct impact of the flange part 400 against the wall 460 as a result of vibrations. It should be mentioned that the previously indicated radial play between the flange part 400 and the mounting part 450 and the above-mentioned elastomeric inlay can also under certain conditions allow a slight amount of "skew" or slight rotation with respect to the centered position in the receptacle defined by the course of the wall section 460*a* and by the course of the associated outside surface of the flange part 400.

Many different designed are possible for the outside contour of the plug-in section of the support element, i.e., for the flange section of the flange part 400, and for the inside contour of the transmission-side mounting receptacle, i.e., for the inside contour of the wall section 460*a*. Within the scope of the design alternatives, the goal will be to distribute the reactive forces or rotational forces which arise during operation over the largest possible circumferential angle. Thus a support over a total circumferential angle of at least approximately 90°, preferably of at least approximately 180°, and most preferably of at least approximately 270° is advantageous. In the exemplary embodiment shown, the reactive forces which occur during operation are supported over almost the entire circumferential angle of 360°.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuating device for a friction clutch device installed in the drive train of a motor vehicle, said friction clutch device comprising at least one friction clutch, said actuating device comprising:

a support element which is fixed in the axial direction and fixed against rotation, said support element comprising a radially outer support sleeve and a radially inner support sleeve which are concentric to an axis of rotation, at least one actuating element which engages said support element and can translate axially relative to said support element in order to actuate a respective said friction clutch when said at least one actuating element is rotated relative to said support element about said axis of rotation, said at least one actuating element comprising an intermediate sleeve located radially between said radially outer support sleeve and said radially inner support sleeve, and at least one actuator assigned to a respective said at least one clutch for rotating a respective said at least one actuating element.

2. An actuating device as in claim 1 wherein said friction clutch device is a multiple friction clutch device comprising a first friction clutch and a second friction clutch, said actuating device comprising a first actuating element which engages said support element and can translate axially relative to said support element in order to actuate said first friction clutch when said first actuating element is rotated relative to said support element, a first actuator assigned to said first clutch for rotating said first actuating element, a second actuating element which engages said support element and can translate axially relative to said support element in order to actuate said second friction clutch when said second actuating element is rotated relative to said support element, and a second actuator assigned to said second clutch for rotating said second actuating element.

3. An actuating device as in claim 1 wherein each said actuating element engages said support element by means of one of a helical thread, a curve follower, and a ramp.

4. An actuating device as in claim 1 wherein one of said support element and said actuating element has an essentially cylindrical outside surface with one of a single flight and a multi-flight external thread, the other of said support element and said actuating element having an essentially cylindrical inside surface with a respective one of a single flight and a multi-flight internal thread which engages said external thread by one of direct sliding engagement and at least one rolling element and at least one sliding element.

5. An actuating device as in claim 4 wherein said internal thread and said external thread are designed as one of flat threads, trapezoidal threads, and round threads.

6. An actuating device as in claim 4 comprising a plurality of balls which serve as rolling elements between said internal thread and said external thread.

7. An actuating device as in claim 1 wherein one of said support element and said actuating element has one of an essentially cylindrical outside surface with one of a single flight and a multi-flight external thread, and an essentially cylindrical inside surface with one of a single flight and a multi-flight internal thread, the other of said support element and said actuating element having a respective one of an axially supported thread engager which projects radially inward to engage said external thread and an axially supported thread engager which projects radially outward to engage said internal thread.

8. An actuating device as in claim 7 wherein said other element comprises a ring shaped guide groove, said thread engager comprising one of a rolling element and an antifriction element and a sliding element which is free to move circumferentially in said ring-shaped groove.

9. An actuating device as in claim 7 wherein said one of said external thread and said internal thread has a pitch which changes in the axial direction.

10. An actuating element as in claim 1 wherein said support element and said actuating element have ramp areas which rise axially in the circumferential direction, said ramp areas converting rotational movement of said actuating element into said translational movement.

11. An actuating device as in claim 1 wherein one of said support element and said actuating element has at least one circumferential guide curve which rises axially in the circumferential direction, the other of said support element and said actuating element having at least one curve follower which can engage a respective at least one said guide curve to convert rotational movement into translational movement.

12. An actuating device as in claim 11 wherein said guide curve rises axially in the circumferential direction in a linear manner.

13. An actuating device as in claim 11 wherein said guide curve rises axially in the circumferential direction in a nonlinear manner.

14. An actuating device as in claim 11 wherein said one of said support element and said actuating element has one of an outside circumferential surface and an inside circumferential surface having one of a circumferential recess and a circumferential opening defining said guide curve, said curve follower engaging said one of said recess and said opening.

15. An actuating device as in claim 11 wherein said actuating element has said guide curve.

16. An actuating device as in claim 1 wherein said intermediate sleeve has at least one circumferential guide curve which rises axially in the circumferential direction, said device further comprising at least one curve follower which extends radially between said inner support sleeve and said outer support sleeve and can engage a respective at least one said guide curve to convert rotational movement into translational movement.

17. An actuating device as in claim 16 wherein said curve follower comprises a spindle mounted on one of said outer support sleeve and said inner support sleeve.

18. An actuating device as in claim 1 wherein said support element and said at least one actuating element are one of metal sheet and metal plate parts.

19. An actuating device as in claim 1 wherein said support element and said at least one actuating element are made of plastic.

20. An actuating device as in claim 1 wherein one of said support element and said at least one actuating element is made of metal and the other of said support element and said at least one actuating element is made of plastic.

21. An actuating device as in claim 1 wherein one of said support element and said at least one actuating element is made of one of a lubricant-modified and a self-lubricating plastic.

22. An actuating device as in claim 1 wherein said at least one actuator is a translational actuator, said device further comprising at least one coupling mechanism connected between said actuator and said actuating element for convening translational movement to rotational movement.

23. An actuating device as in claim 11 wherein said coupling mechanism comprises one of a traction element and a thrust element which can be driven by the actuator to translate and to act on one of said actuating element and a lever section of said actuating element, and which can pivot in a plane essentially orthogonal to the axis of rotation, said one of said traction element and said thrust element transferring an essentially tangential actuating force to said actuating element.

24. An actuating device as in claim 1 wherein said at least one actuator is a rotating actuator, said device further comprising at least one coupling mechanism connecting said actuator and said actuating element for rotation in common.

25. An actuating device as in claim 24 wherein said actuator comprises an output section with an axis of rotation which is at least substantially parallel to the axis of rotation of said actuating element.

26. An actuating device as in 24 further comprising a toothed wheel gearing system for connecting said actuator and said actuating element for rotation in common.

27. An actuating device as in claim 26 wherein said toothed wheel gearing system has an input section comprising a toothed wheel on said actuator and an output section comprising one of a toothed wheel and a toothed wheel sector and a toothed rim and a toothed rim sector on said actuating element.

28. An actuating device as in claim 24 wherein said actuator has an axis of rotation which is at least substantially orthogonal to the axis of rotation of the actuating element.

29. An actuating device as in claim 24 further comprising a worm gearing system for connecting said actuator and said actuating element for rotation in common.

30. An actuating device as in claim 29 wherein said worm gearing system has an input section comprising a worm on said actuator and an output section comprising one of a toothed wheel and a toothed wheel sector and a toothed rim and a toothed rim sector on said actuating element.

31. An actuating device as in claim 1 further comprising a coupling mechanism connecting said actuator to said actuating element, and an arresting device assigned to at least one of an output part of the actuator, a torque transferring component of one of the coupling mechanism and a transmission, and the actuating element, said arresting device preserving the instantaneous state of clutch actuation corresponding to the instantaneous axial and rotational position of the actuating element regardless of the instantaneous activation state of the actuator.

32. An actuating device as in claim 31 wherein said arresting device can be activated and deactivated.

33. An actuating device as in claim 1 further comprising a support base which is stationary with respect to the clutch device, said support base having a rotational support section, said support element comprising an opposing rotational support section which positively rotationally engages said support section of said base in order to secure said support element against rotation.

34. An actuating device as in claim 33 wherein said opposing rotational support section positively axially engages said rotational support section of said support base in order to secure said support element axially in the drive train.

35. An actuating device as in claim 34 wherein said support section and said opposing support section can be engaged by quarter-turn type fastening engagement.

36. An actuating device as in claim 1 further comprising a support base which is stationary with respect to the clutch device, said support base having an axial securing section, said support element comprising an opposing axial securing section which positively axially engages said axial securing section of said base in order to secure said support element axially in the drive train.

37. An actuating device as in claim 1 comprising an actuating unit which can be handled as a unit and which comprises said support element and said at least one actuating element.

* * * * *